US011210777B2

United States Patent
Fitzgerald et al.

(10) Patent No.: US 11,210,777 B2
(45) Date of Patent: Dec. 28, 2021

(54) SYSTEM AND METHOD FOR DETECTION OF MOBILE DEVICE FAULT CONDITIONS

(71) Applicant: YOUGETITBACK Limited, Cork (IE)

(72) Inventors: William Fitzgerald, Cork (IE); Donal O'Shaughnessy, Cork (IE); Donie Kelly, Cork (IE); Paul O'Sullivan, Cork (IE); Liam O'Callaghan, Cork (IE); James Donovan, Cork (IE); Shane Hallinan, Cork (IE); Charlie McGrory, Cork (IE); Wayne Morgan, Cork (IE); Uday Chitturi, Cork (IE); Patrick Conway, Cork (IE); John Mollaghan, Cork (IE); Kevin Sutton, Cork (IE)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 161 days.

(21) Appl. No.: 15/899,339

(22) Filed: Feb. 19, 2018

(65) Prior Publication Data
US 2018/0342050 A1 Nov. 29, 2018

Related U.S. Application Data

(63) Continuation-in-part of application No. 15/582,471, filed on Apr. 28, 2017.
(Continued)

(51) Int. Cl.
*G06T 7/00* (2017.01)
*G01N 21/88* (2006.01)
(Continued)

(52) U.S. Cl.
CPC ......... *G06T 7/001* (2013.01); *G01N 21/8851* (2013.01); *G01N 21/95* (2013.01);
(Continued)

(58) Field of Classification Search
None
See application file for complete search history.

(56) References Cited

U.S. PATENT DOCUMENTS 6,386,038 B1 * 5/2002 Lewis, III ............. G01N 29/14
702/39
7,590,920 B2 9/2009 Ouyang et al.
(Continued)

OTHER PUBLICATIONS

International Preliminary Report on Patentability dated Nov. 8, 2018 by the International Bureau of WIPO for related international application PCT/US2017/030288.
(Continued)

*Primary Examiner* — John C Kuan
(74) *Attorney, Agent, or Firm* — Dickinson Wright PLLC

(57) ABSTRACT

There is presented a system and method for detecting mobile device fault conditions, including detecting fault conditions by software operating on the mobile device. In one embodiment, the present invention provides for systems and methods for using a neural network to detect, from an image of the device, that the mobile device has a defect, for instance a cracked or scratched screen. Systems and methods also provide for, reporting the defect status of the device, working or not, so that appropriate action may be taken by a third party.

17 Claims, 23 Drawing Sheets

Related U.S. Application Data

(60) Provisional application No. 62/464,366, filed on Feb. 27, 2017, provisional application No. 62/463,725, filed on Feb. 26, 2017, provisional application No. 62/329,159, filed on Apr. 28, 2016.

(51) Int. Cl.
| | |
|---|---|
| *G01N 21/95* | (2006.01) |
| *G06K 9/52* | (2006.01) |
| *G06T 7/80* | (2017.01) |
| *G06N 3/08* | (2006.01) |
| *H04N 5/235* | (2006.01) |
| *H04N 5/262* | (2006.01) |
| *H04N 5/232* | (2006.01) |
| *H04N 7/18* | (2006.01) |
| *G06N 3/04* | (2006.01) |
| *G06T 7/13* | (2017.01) |
| *G01N 21/958* | (2006.01) |

(52) U.S. Cl.
CPC .............. *G06K 9/52* (2013.01); *G06N 3/0454* (2013.01); *G06N 3/08* (2013.01); *G06N 3/084* (2013.01); *G06T 7/0004* (2013.01); *G06T 7/13* (2017.01); *G06T 7/80* (2017.01); *H04N 5/2353* (2013.01); *H04N 5/2354* (2013.01); *H04N 5/23222* (2013.01); *H04N 5/2628* (2013.01); *H04N 7/18* (2013.01); *G01N 21/958* (2013.01); *G01N 2021/8858* (2013.01); *G01N 2021/8893* (2013.01); *G01N 2021/9513* (2013.01); *G01N 2201/0221* (2013.01); *G06T 2207/10024* (2013.01); *G06T 2207/20084* (2013.01); *G06T 2207/30121* (2013.01)

(56) References Cited

U.S. PATENT DOCUMENTS

| | | |
|---|---|---|
| 8,867,817 B1 | 10/2014 | Cooper et al. |
| 8,964,062 B1 | 2/2015 | Neglur |
| 2006/0007177 A1 | 1/2006 | McLintock |
| 2015/0123987 A1* | 5/2015 | Hong .................. G06K 9/4661 |
| | | 345/593 |
| 2015/0339736 A1 | 11/2015 | Bennett |
| 2016/0225036 A1 | 8/2016 | Nguyen |
| 2017/0091557 A1* | 3/2017 | Wong ................. G06K 9/00744 |
| 2017/0256051 A1* | 9/2017 | Dwivedi ............... G06T 7/0008 |
| 2017/0344884 A1* | 11/2017 | Lin ........................ G06N 3/084 |
| 2020/0167907 A1* | 5/2020 | Yan ........................ G05D 1/021 |

OTHER PUBLICATIONS

Bian Xiao et al., Multiscale Fully Convolutional Network with Application to Industrial Inspection, 2016 IEEE Winter Conference on Applications of Computer Vision (WACV), IEEE, Mar. 7, 2016 (Mar. 7, 2016), pp. 1-8.

Yuan Lunxi et al., The Development and Prospect of Surface Defect Detection Based on Vision Measurement Method, 2016 12th World Congress on Intelligent Control and Automation (WCICA), IEEE, Jun. 12, 2016 (Jun. 12, 2016), pp. 1382-1387.

Zhang Lei et al., Road Crack Detection Using Deep Convolutional Neural Network, 2016IEEE International Conference on Image Processing (ICIP), IEEE, Sep. 25, 2016 (Sep. 25, 2016), pp. 3708-3712.

Notification of Transmittal of the International Search Report and the Written Opinion of the International Searching Authority, dated May 2, 2018, by the European Patent Office / Searching Authority, for related international application PCT/US2018/019380.

Notification Concerning Transmittal of Copy of International Preliminary Report on Patentability (Chapter 1 of the Patent Cooperation Treaty) dated Nov. 8, 2018 (Nov. 8, 2021) on related international application PCT/US2017/030288 issued by The International Bureau of WIPO.

Communication pursuant to Article 94(3) EPC (European Office Action) dated Jul. 12, 2021 (Jul. 12, 2021) on related European patent application 17729570.6 issued by the European Patent Office.

* cited by examiner

SYSTEM AND METHOD FOR DETECTION OF MOBILE DEVICE FAULT CONDITIONS

CROSS REFERENCE TO RELATED APPLICATIONS

This application claims full benefit of and priority to U.S. provisional patent application No. 62/329,159 filed Apr. 28, 2016 titled, "System and Method For Detection Of Mobile Device Fault Conditions," and claims full benefit of and priority to U.S. provisional patent application No. 62/464,366 filed Feb. 27, 2017 titled, "System And Method For Monitoring and Tracking Device Health", and claims full benefit of and priority to U.S. provisional patent application No. 62/463,725 filed Feb. 26, 2017 titled, "System and Method For Detection Of Display Defects" is a continuation-in-part of U.S. non-provisional application Ser. No. 15/582,471 filed 2017 Apr. 28, titled, "System and Method For Detection Of Mobile Device Fault Conditions," the disclosures of which are fully incorporated herein by reference for all purposes.

FIELD AND BACKGROUND OF THE INVENTION

Field of the Invention

The present invention relates to systems and methods for detecting fault conditions in mobile devices. More particularly, the present invention provides for systems and methods for detecting a that a mobile device has a fault such as cracked, scratched, or otherwise damaged screen, and reporting the status of the screen, working or not, so that appropriate action may be taken by a third party.

Background of the Invention

Today, the use of mobile electronic devices is widespread, and increasing numbers of people utilize such devices in their daily lives. Examples of such devices include cellular phones, smart watches, portable digital assistants (PDAs), digital cameras, intelligent devices for the "Internet of things," and laptop computers. As the growth of use of mobile devices has increased, so has the need to provide insurance and cost-effective warranty coverage for such devices. Importantly, smart mobile devices can increase a user's productivity and quality of life, but they are susceptible to damage from a variety of sources, such as water damage, shock damage, and other forms of unexpected use or misuse. It is well known that the displays on mobile devices (also interchangeably identified as "screens" herein), while constructed of more durable or tougher substances such as advanced forms of glass, are still susceptible to fracture or breakage. When a user's mobile device becomes damaged, warranty replacement or insurance coverage are often sought by the owner of a damaged device to obtain a working model.

One problem plaguing this industry is fraud. An industry has grown around the filing of fraudulent claims for allegedly lost or stolen mobile devices. This problem is further compounded with a growing need for insurance on the secondary mobile device market, where devices are more likely to have a fault condition present. Countless dollars are lost each year as a result of fraudulent claims. For example, a user of a mobile device may drop or misuse the device and crack the display/screen, then attempt to apply for third party damage insurance after the incident in an attempt to obtain a replacement model. Also, some unscrupulous persons may claim that a device that was purchased was received by post in a damaged condition, when the person actually damaged the device themselves. Further, a fraudulent seller may present a picture to a customer on websites such as EBay showing a perfectly good phone, then selling a faulty device (such as with a cracked display). Even worse, collusion may occur between a mobile device owner and a "repair" facility where an insured device is claimed damaged, and the repair facility splits the insurance fees with the customer for fraudulently claiming devices required repair when they in fact were not faulty.

Current systems and methods employed to check the veracity of such claims are not particularly sophisticated or successful in detecting and deterring fraud, because it is difficult or impossible by current methods for a third to remotely assess the condition of a mobile device and determine whether a warranty or insurance claim is valid. Therefore, there is a need for systems and methods that overcome these and other problems associated with the prior art. Moreover, there is a more general need to provide for systems and methods to determine that a fault condition exists (or not) in a mobile device, and allow such information to be reported to a third party entity.

SUMMARY OF THE INVENTION

The following technical disclosure is exemplary and explanatory only and is not necessarily restrictive of the invention as claimed.

As used herein, the term "mobile device," "mobile electronic device," or "device" generally refers to any electronic device capable of being moved from place to place, and has components (such as displays or screens) that can become faulty or damaged. A mobile device may be a stand-alone device such as a laptop computer, a desktop computer, a mobile subscriber communication device, a mobile phone, a smart watch, a personal digital assistant (PDA), a data tablet, a digital camera, a video camera, a video game console, a media player, a global positioning system (GPS), Universal Serial Bus (USB) keys, mobile weapons, smart watches or jewelry, embedded electronics, and combinations thereof. A mobile electronic device may also be any electronic device integrated with another system or device. For example, a stereo, global positioning system, or other electronic device contained within a vehicle may be utilized in concert with the present invention. Software to implement methods of the present invention can be (1) installed on, or (2) downloaded onto a mobile device indirectly or directly at any time by an authorized user through the Internet, SMS text message, through wireless communication with an app provisioning store, or in any other suitable manner and at any suitable time for carrying out a method according to the invention. For example, the software may be installed on the device when purchased or downloaded after the device is purchased, or even after the device damaged or otherwise becomes faulty. The mobile device may be insured against loss or theft, and systems and methods of the present invention may operate as part of, or in addition to, an insurance policy on the mobile device.

There is presented a system and method for detecting mobile device fault conditions, including detecting fault conditions by software operating on the mobile device. A user that has a mobile device with an alleged fault condition (such as a cracked screen/display) may be requested to install an application (such as the Fault State Test Application (FSTA) referred to above) on the allegedly faulty mobile device. The FSTA provides a trusted method to assess the veracity of a claimed fault condition on the mobile device (such as a cracked or damaged screen/display). The FSTA interacts with the mobile device's user to obtain sensor readings and user inputs that are utilized to assess whether the mobile device is in fact faulty. The determination of a fault/non-fault condition can then be displayed and/or sent to a third party (such as an insurance company that is being asked to provide policy coverage for the mobile device) in a secure manner (so that the test performed on the mobile device provides a trusted result). In one embodiment, the data sent by the FSTA in the mobile device is encrypted to prevent tampering or spoofing by the user of the mobile device, and is suitably decrypted by the recipient or software running within a server. The FSTA in the mobile device is further configured to assist a user with capturing an image of at least a part of the mobile device such as a display or casing of the mobile device, performing optional pre-processing of the captured image, transmitting the pre-processed captured image to a host server, and whereupon the host server is configured to perform further analysis such as through use of a convolutional neural network, wherein such analysis detects and identifies mobile device defects from analysis of the pre-processed captured image received from the mobile device.

In another embodiment, a method is provided for determining that a fault condition exists within a touch-sensitive display of a mobile device, comprising: prompting a user to touch the display; prompting the user to drag the touched point across a displayed pattern; illuminating the display with a painted area to confirm areas touched by the user; measuring a plurality of pressure values measured from the user's contact from the touched point as it is dragged across the display; determining from the plurality of pressure values whether a fault is found in the display of the mobile device by comparing the measured pressure values to a predetermined criterion. Any desired results may be generated, stored in the memory of the mobile device or formatted for transmission to a host server. The test results may comprise any information obtained from the user input to the FSTA or from measurements of sensors by the mobile device or other data such as timing, extent of test completed or other parameters, and may further comprise the status of at least one fault state within the mobile device. Methods of the present invention may further comprise encrypting the test results prior to transmitting the test results to the host server. The results of the determination, test results, and/or other information may be reported to a third party, wherein the third party includes at least one of: the owner of the mobile device, an insurance agency, a potential buyer, a transferee of the mobile device, a law enforcement agency, and a lost device recovery entity. The third party may be informed through any appropriate technique of the results of the determination or of any kind of test results; and in one aspect, the third party accesses a host server to determine whether a fault state exists within the mobile device; the fault state may comprise test results from the mobile device.

There is also provided a method for determining that a fault condition exists within a touch-sensitive display of a mobile device, that includes the steps of: prompting a user to touch a plurality of regions the display; illuminating the display with a painted area to confirm areas touched by the user; accumulating a plurality of magnetometer readings from the mobile device measured when the user touches each of the respective areas; determining from the plurality of magnetometer readings whether a fault is found in the display of the mobile device by comparing the measured magnetometer readings to a predetermined criterion. As in other embodiments, any desired results may be generated, stored in the memory of the mobile device or formatted for transmission to a host server. The test results may comprise any information obtained from the user input to the FSTA or from measurements of sensors by the mobile device or other data such as timing, extent of test completed or other parameters, and may further comprise the status of at least one fault state within the mobile device. Methods of the present invention may further comprise encrypting the test results prior to transmitting the test results to the host server. The results of the determination, test results, and/or other information may be reported to a third party, wherein the third party includes at least one of: the owner of the mobile device, an insurance agency, a potential buyer, a transferee of the mobile device, a law enforcement agency, and a lost device recovery entity. The third party may be informed through any appropriate technique of the results of the determination or of any kind of test results; and in one aspect, the third party accesses a host server to determine whether a fault state exists within the mobile device; the fault state may comprise test results from the mobile device.

An additional embodiment of the present invention provides a system comprising: a mobile device, the device comprising: a processor in communication with a memory; a user interface in communication with the processor, the user interface including a touch-sensitive display and a data entry interface; a communications module in communication with the processor and configured to provide a communications interface to a host server, the host server further including a database; wherein the memory of the mobile device includes instructions that when executed by the processor cause the mobile device to perform the steps of: prompting a user to touch the display; prompting the user to drag the touched point across a displayed pattern; illuminating the display with a painted area to confirm areas touched by the user; measuring a plurality of pressure values measured from the user's contact from the touched point as it is dragged across the display; determining from the plurality of pressure values whether a fault is found in the display of the mobile device by comparing the measured pressure values to a predetermined criterion. In various aspects of the system embodiment, any desired results may be generated, stored in the memory of the mobile device or formatted for transmission to a host server. The test results may comprise any information obtained from the user input to the FSTA or from measurements of sensors by the mobile device or other data such as timing, extent of test completed or other parameters, and may further comprise the status of at least one fault state within the mobile device. Methods of the present invention may further comprise encrypting the test results prior to transmitting the test results to the host server. The results of the determination, test results, and/or other information may be reported to a third party, wherein the third party includes at least one of: the owner of the mobile device, an insurance agency, a potential buyer, a transferee of the mobile device, a law enforcement agency, and a lost device recovery entity. The third party may be informed through any appropriate technique of the results of the determination or of any kind of test results; and in one aspect, the third party accesses a host server to determine whether a fault state exists within the mobile device; the fault state may comprise test results from the mobile device.

There is also provided a system comprising a mobile device communicatively coupled to a host server. The mobile device includes a processor in communication with a memory; a user interface in communication with the processor, the user interface including a touch-sensitive display and a data entry interface; a communications module in communication with the processor and configured to provide a communications interface to the host server, the host server including a server processor communicatively connected to a database, a server communications interface, a server user interface, and a server memory. The server may also be remotely accessed by a third party such as an insurance agency, a mobile device repair agency, a mobile device seller, an advertising agent, a mobile device warranty reseller, an authorized user of the mobile device, and combinations thereof. The database of the host server may maintain statistics based on analysis of images respectively corresponding to the analyzed mobile devices, and may make those statistics available for further analysis or review by any of the aforementioned third parties.

The memory of the mobile device includes instructions that when executed by the processor cause the mobile device to perform the steps of: prompting a user of the mobile device to place the mobile device so that a display section of the mobile device faces a reflective surface of a mirror; performing a tracking calibration function to adjust the mobile device position and display for optimal image capture; modifying a brightness setting and a camera sensitivity setting of the mobile device to optimize image capture; determining that the mobile device is in an acceptable orientation with respect to the mirror, and thereupon, capturing an image of the mobile device as reflected from the mirror; and formatting the captured image for transmission to the server for defect analysis.

The tracking calibration function of the present invention may be accomplished in any desired manner, and may further comprise: retrieving one or more ambient lighting parameters from the mobile device; adjusting a brightness parameter of the display of the mobile device based upon the retrieved ambient lighting parameters; adjusting a sensitivity parameter of the camera of the mobile device from the analyzed ambient lighting settings; determining from camera data obtained from the mobile device that the mobile device is out of optimal placement, whereupon: a direction for the user to move the mobile device to obtain an optimal placement of the mobile device with respect to the mirror is calculated; and the direction is displayed on the mobile device in a manner eadable by the user in the mirror.

Camera sensitivity may be adjusted to optimize placement of the mobile device with respect to the mirror/reflective device, and may be further adjusted to maximize the quality of a captured image once the mobile device is in acceptable position with respect to the mirror/reflective device. Different operating systems of mobile devices (for example iOS and Android operating systems) may provide for varying methods to accomplish camera sensitivity adjustment. For example, adjusting a sensitivity parameter of the camera of the mobile device may further comprise adjusting an ISO setting of the camera and adjusting a shutter speed of the camera. Adjusting a sensitivity parameter of the camera of the mobile device may also comprise adjusting an exposure compensation value associated with the camera of the mobile device.

The display of the mobile device may be configured to render images that assist with determination of edges of the display in further image processing. For example, one embodiment provides for displaying one or more fiducials on the display of the mobile device; and sensing one or more of the fiducials from camera data obtained from the mobile device. By sensing the one or more fiducials, and determining a moment, orientation, and placement of the fiducials within an image, edges of the display may be inferred from the detection of the location of the fiducials in the image when compared to the known rendering of the fiducials on the screen of the mobile device.

Obtaining data from a camera and/or sensors of the mobile device may be accomplished in any desired manner. For example, retrieving one or more ambient lighting parameters from the mobile device may further comprise obtaining the parameters from an API associated with an operating system installed on the mobile device.

The image captured by a camera of the mobile device may be pre-processed in any desired manner before further processing to detect defects in a display. For instance, formatting the captured image may further comprise rotating the captured image to a portrait mode; and cropping the image. Depending on an orientation of the mobile device when the captured image was obtained, rotation may not be necessary. Further, rotation of the captured image may be accomplished in small amounts to de-skew the captured image. Additionally, the rotation and/or cropping may be preferably accomplished by a processor of the mobile device, or alternatively, by the server processor of the host server once the captured image has been transmitted to the host server.

The captured image, with additional pre-processing such as rotation and cropping (if performed), can be formatted for transmission to the host server. The mobile device is communicatively coupled to the host server, for instance through a wireless communications protocol, to a mobile network operator, that in turn is coupled to a network such as the internet, which is in turn coupled to the communications interface of the host server. Alternatively, the mobile device may communicate directly through a wireless protocol to the host server, such as through a WiFi connection or a Bluetooth connection. In any event, the captured image may be further processed in the mobile device, the host server, or any combination of the two.

As mentioned above, the host server may undertake further processing of the captured and/or preprocessed image from the mobile device, in furtherance of detecting mobile device defects that may be identifiable within the captured image. Processing may be completed within the server processor, within a neural network coupled to the server processor, or a combination thereof. For example, the server memory may include instructions that when executed by the server processor cause the server to perform the steps of: receiving the captured image from the server communications interface; extracting, from the captured image, a subimage corresponding to the mobile device screen; transforming the perspective of the subimage into a rectangular aspect; resampling the transformed subimage to a predetermined input image data configuration; presenting the resampled transformed subimage to a pre-trained neural network to identify one or more device faults; and obtaining from the neural network an indication of a defect that corresponds to the screen of the mobile device.

Obtaining from the neural network an indication of a defect may further comprise obtaining, from the neural network, indicia showing a portion of the mobile device screen that activates a defective class in the pre-trained neural model. Such indicia may include a colored polygon that is rendered in such a manner to circumscribe the portion of the mobile device that activates the defective class. Such indicia may also include a heat map corresponding to areas most likely associated with the defective class, with likelihood of defect correlating to an assigned color in the heat map. For instance, red in the heat map indicates an area most likely to contain a defect, oranges and yellows less likely, greens even further likely, light blues less likely still, and blue/black/clear least likely to correlate to an area containing a defect. The classification may occur in any desired manner. For example obtaining from the neural network an indication of a defect may further comprise identifying a local area of a fault in the display of the mobile device using class activation mapping.

The neural network of the present invention may be pre-trained in any desired manner before data is applied to the input of the network for classification. Those of skill in the relevant arts understand that the neural network may be trained with any desired or conventional training methodology such as backpropagation. For example, training the pre-trained neural network may be accomplished with training data stored in a database in the server, the training data comprising at least: device screen training images and identified defects respectively corresponding to the device screen training images. The identified defects stored in the training database correspond to mobile device defects identifiable by aspects of the present invention including defects on the display of the mobile device or in fact any other aspect of the mobile device such as its casing. These detectable defects may comprise, for example, a crack or scratch in the display of the mobile device; a check, crack, chip, blemish, or break in a casing of the mobile device; a bezel crack; a wear point on a casing of the mobile device; a stuck or dead pixel on the display of the mobile device; LCD bleed in the display of the mobile device; a pink hue defect in the display of the mobile device; an object (such as a user's body part, a sticker, or other item) blocking the display of the mobile device; a detected aspect ratio of the mobile device screen not corresponding to an expected aspect ratio for the corresponding mobile device; a wear pattern on the mobile device not corresponding to an expected usage profile of the mobile device; a reflection on the display of the mobile device; a smudge on the display of the mobile device; a logo or other identifier found in the image of the mobile device not corresponding to an expected manufacturer of the mobile device; a seam separation on the mobile device; a missing component on the mobile device; and any other type of defect that may be determined from an image captured of the mobile device. Any of the aforementioned defects intended to be detected by the mobile device may be assigned to a defective class in the neural network training implementation.

Once embodiments of the present invention are presented with captured images of mobile devices, the analysis results may be stored in database to augment the training data, allowing for additional retraining of the neural network to improve its defect detection performance. Training data may also be manually modified to identify defects in a captured image of a mobile device where the neural network previously failed to detect a defect. Further, training data may also be manually modified to identify a captured image of a mobile device where the neural network previously indicated a defect was present, but as a result of a false positive, no defect should have been identified. As such, the training data stored in the database may be augmented in any desired manner with a new training image corresponding to a captured image of the mobile device and a corresponding identified defect associated with the captured image of the mobile device, or an area erroneously identified as containing a defect when in fact, no defect exists. Once training data is updated in the database the pre-trained neural may be re-trained with the augmented training data at any desired time, or on a periodic basis such as a determined schedule, or after a predetermined number of augmented images are added to the database.

The classification system may operate on any desired pixel, voxel, and/or color configuration of the image data, for example where the predetermined input image data configuration may comprise a pixel configuration of 320× 544 pixels. The neural network may comprise any desired architecture, including a convolutional neural network (CNN) architecture such as described more fully below. Further the neural network may be implemented in any desired manner, such as through software stored in the server memory, through external hardware communicatively coupled to the server processor, or through a combination of stored software and external hardware. One non-limiting example of external hardware may include a dedicated neural network processor, or a GPU (graphics processing unit) configured to perform neural network operations.

Methods of the present invention may be executed in all or part of the mobile device, the host server, external neural network hardware, and servers and/or processors communicatively coupled to the foregoing.

BRIEF DESCRIPTION OF THE DRAWINGS

A more complete understanding of the present invention may be derived by referring to the detailed description and claims when considered in connection with the following illustrative figures.

DETAILED DESCRIPTION

Figure 8:
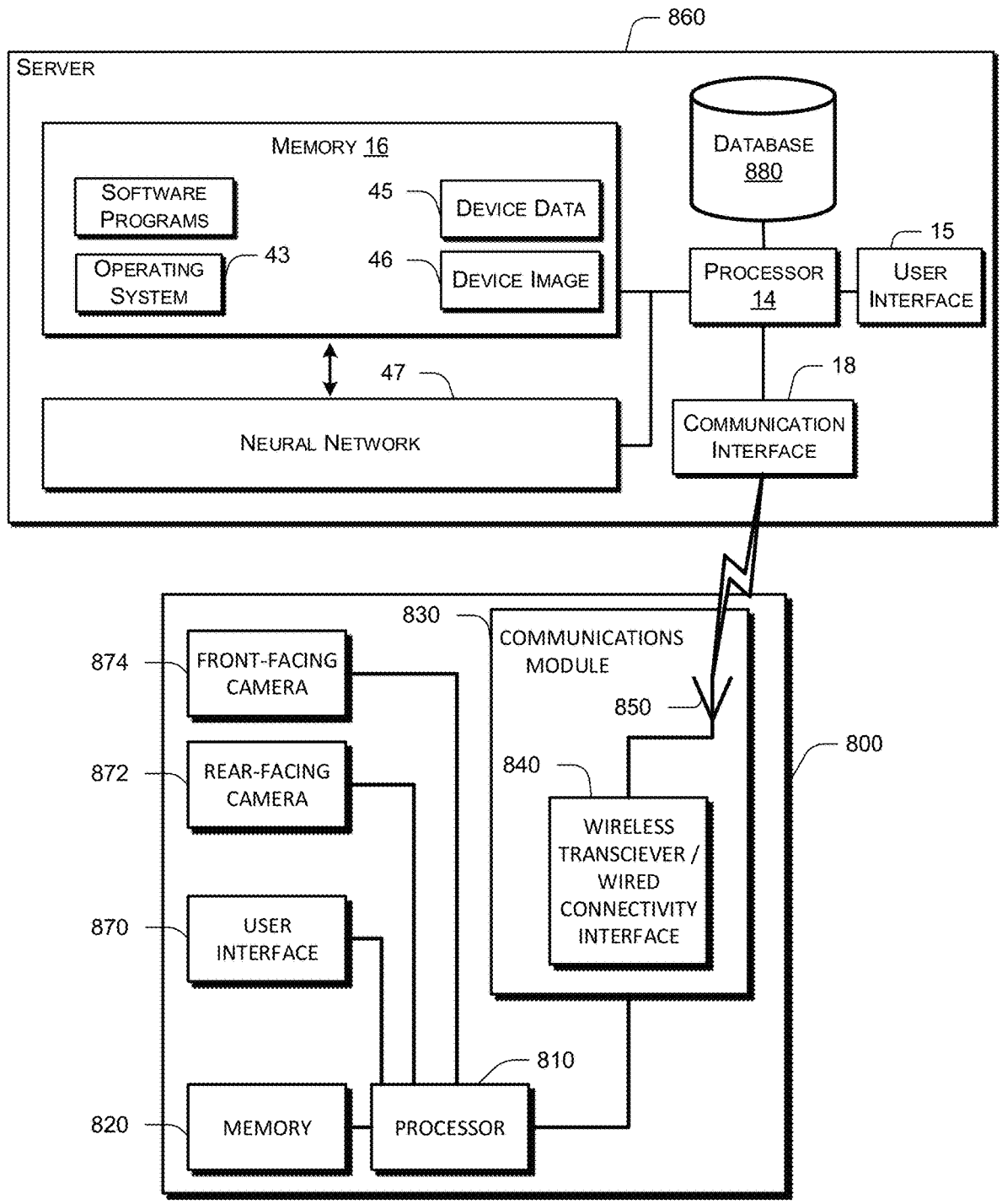
FIG. 8 illustrates a block diagram of a system embodiment of the present invention.

The exemplary system depicted in FIG. 8 comprises a mobile device 800 that includes a processor 810 coupled to a memory 820 which may include volatile memory, non-volatile memory (such as FLASH memory) or a combination thereof. A communications module 830 comprises a wireless transceiver 840 for wirelessly communicating with one or more servers, such as host server 860 and other entities through antenna 850, although those of skill in the art may appreciate that a wired connection may be established to provide connectivity in lieu of or in addition to the wireless connection. The mobile device also includes a user interface 870 coupled to the processor 810. The mobile device 800 may include any suitable power source, such as a battery (not shown). The mobile device 800 may include any other desired components, such as a global positioning system (GPS) to provide geolocation information for locating the mobile device. Some or all of the components of the mobile device 800 may include (or be in communication with) a hardware identification module (not shown) such as a universal subscriber identity module and/or removable user identity module. The hardware identification module may be coupled to the processor 810 and may include an identifier that can be compared to a predetermined identifier to determine whether the hardware of the mobile device 800 has been altered. The hardware identification module (and predetermined identifier) may include any suitable identifier, such as an electronic serial number, a local area identity identifier, an integrated circuit identifier, an international mobile subscriber identifier, an authentication key identifier, and/or an operator-specific emergency number identifier. The identifier may be stored in the memory 820 and transmitted to the host server 860 for comparison to a predetermined identifier.

The functionality of the mobile device 800, including the methods described herein (in whole or in part), may be implemented through the processor 810 executing computer-readable instructions stored in the memory 820 of the mobile device 800. The memory 820 may store any computer-readable instructions and data, including software applications, user-installed or third-party-installed "apps," applets, and embedded operating code.

Additionally, the software application may be configured to operate with minimal underlying hardware functionality. For example, the application may be initiated before the mobile device establishes a network connection. Such a situation may be provided, for instance, when the software application is installed on a SIM card in the mobile device, and the application launches before other software in the mobile device operating system. Alternately or in addition, a data element such as a link or a URL (universal resource locator) may reside on the SIM card, and by launching an application such as a browser with the URL or link, an application referenced by the link or URL may be loaded into the mobile device from a remote server and/or executed directly from on the remote server.

Software performing methods of the present invention may be provided with the device or downloaded onto the mobile device by an authorized user, and/or may be further resident in memory 16 of the host server 860 and executable by the server processor 14. The functionality of the mobile device 800 as well as the host server 860 may also be implemented through various hardware components storing machine-readable instructions, such as application-specific integrated circuits (ASICs), field-programmable gate arrays (FPGAs) and/or complex programmable logic devices (CPLDs), graphics processing units (GPUs), and neural network processing or simulation circuits. Systems according to aspects of the present invention may operate in conjunction with any desired combination of software and/or hardware components.

The processor 810 retrieves and executes instructions stored in the memory 820 to control the operation of the mobile device 800. Similarly the server processor 14 retrieves and executes instructions stored in the server memory 16 to control the operation of the host server 860. Any number and type of processor such as an integrated circuit microprocessor, microcontroller, and/or digital signal processor (DSP), can be used in conjunction with the present invention. The memory 820 stores instructions, data, messages transmitted from (or received by) the mobile device 800, and any other suitable information, and the server memory 16 similarly stores instructions, data, messages transmitted from (or received by) the host server 860, and any other suitable information. A memory 820 and server memory 16 operating in conjunction with the present invention may include any combination of different memory storage devices, such as hard drives, random access memory (RAM), read only memory (ROM), FLASH memory, or any other type of volatile and/or nonvolatile memory. Data can be stored in the memory 820 or server memory 16 in any desired manner.

The communications interface 830 communicates with one or more servers such as host server 860, or other suitable entities. In like manner, the communication interface 18 of the host server is configured to communicate with the mobile device 800, a general network such as the Internet, or any other suitable entity. Any suitable communications device, component, system, and method may be used in conjunction with the present invention. For example, the wireless transceiver 840 may be configured to communicate using any number and type of cellular protocols, such as General Packet Radio Service (GPRS), Global System for Mobile Communications (GSM), Enhanced Data rates for GSM Evolution (EDGE), Personal Communication Service (PCS), Advanced Mobile Phone System (AMPS), Code Division Multiple Access (CDMA), Wideband CDMA (W-CDMA), Time Division-Synchronous CDMA (TD-SCDMA), Universal Mobile Telecommunications System (UMTS), and/or Time Division Multiple Access (TDMA). A mobile device operating in conjunction with the present invention may alternatively (or additionally) include wireless transceiver(s) (and related components) to communicate using any other method of wireless communication protocol, such as an ISO 14443 protocol, an ISO 18000-6 protocol, a Bluetooth protocol, a Zigbee protocol, a Wibree protocol, a WiFi protocol, an IEEE 802.15 protocol, an IEEE 802.11 protocol, an IEEE 802.16 protocol, an ultra-wideband (UWB) protocol; an IrDA protocol, and combinations thereof; and further, the communication interface 18 of host server 860 may be configured to operate with such protocols to communicate with the mobile device 800 or any other device. The antenna 850 may be configured to transmit and receive any wireless signal in any format, and may comprise a plurality of different antennas to transmit and receive using different wireless protocols.

The communications module 830 can communicate with the server 860 or another device using any other form of connection, such as a wired Internet connection, a wireless Internet connection, a cellular telephone network connection (including a data link connection), a wireless LAN connection, a wireless WAN connection, an optical connection, a Firewire connection, Thunderbolt connection, a Lightening port connection, an e-SATA connection, a USB connection, a mobile device synchronization port connection, a power connection, and/or a security cable. The communications module 830 can be used to communicate with one or more companion devices to monitor the position or status of the mobile device 800 (e.g., by monitoring whether a communication link between the mobile device and companion device is intact), as well as with any number of other devices to help track/locate a lost or stolen mobile device 800.

The mobile device 800 includes a user interface 870. The user interface 870 may include any number of input devices (not shown) to receive commands, data, and other suitable input from a user, as well as any number of output devices (not shown) to provide the user with data, notifications, and other suitable information from the mobile device 800. Likewise, the host server 860 includes user interface 15, and may include any number of input devices (not shown) to receive commands, data, and other suitable input from a user or third party, as well as any number of output devices (not shown) to provide the user/third party with data, notifications, and other suitable information from the host server 860.

Any number of input devices may be included in the user interfaces 870, 15 such as touch pads, touch screens, a mouse/trackball/trackpad, a microphone, and/or an alphanumeric keypad to allow a user to enter instructions and data into the mobile device 800 and host server 860. The term "touch screen" for purposes of the present application may include a display integrated with or in close proximity to a touch interface that is capable of determining when a user applies physical connection to a location proximate the display. The touch screen may have sensors that can measure parameters from the user's interaction, and such sensors may measure capacitance, resistance, pressure, or differential readings resulting from movement of a "touch" to the screen. The user interface 870 may be configured to detect pressure exerted by a user on the keys of a keypad (virtually implemented on the display, or as a physical array of key switches), as well as the time interval between key presses in order to determine if the current user is authorized to use the device. The user interface 870 may also include a microphone to allow the user to provide audio data to the mobile device 800, as well one or more cameras to allow the mobile device to capture still or video images. Similarly, the user interface 15 of the host server 860 may include a microphone to allow a user to provide audio data to the host server 860, as well one or more cameras to allow the server 860 to capture still or video images. In one embodiment, the mobile device 800 comprises a front-facing camera 874 that faces the user when the device is in operation, and a rear-facing camera 872 on an opposite side of the mobile device. The mobile device 800 may include speech recognition software to process verbal input through the user interface 870. The user interface 870, and similarly the server user interface 15 may also include any number of suitable output devices, such as a display screen to visually display information (such as video and text), and/or a speaker to provide auditory output. The display of the mobile device may be configured to sense user touches by any appropriate means, such as capacitive sensing, pressure sensing, gel displacement sensing, resistive sensing, or any other appropriate or conventional touch sending technology utilized by those of skill in the relevant arts. The mobile device 800 may be configured to provide words, phrases, tones, recorded music, or any other type of auditory output to a user through the speaker. As discussed previously, the user interface 870 can be activated to provide information and/or hinder the operation of the mobile device 800 when an unauthorized user attempts to use the mobile device 800. For example, the illumination level of the display may be modulated to draw attention to the mobile device, and unpleasant and/or loud sounds can be played over the speaker.

The mobile device 800 may include one or more biometric devices configured to receive biometric information, such as a fingerprint scanner, an iris scanner, a retinal scanner, and/or a breath analyzer. Input devices such as a microphone or camera may also be utilized to perform biometric analyses, such as a voice analysis or facial recognition. Further, the mobile device may include a magnetometer for measuring magnetic fields (such as may be utilized in an electronic compass), a MEMS or other type of gyroscope for measuring attitude, and accelerometers for measuring changes in movement of the mobile device.

Information provided or received by the user interfaces 870, 15 may be in any appropriate format. For example, a user interface that communicates information to a user in an auditory format may first provide a data header followed by a data value to identify the data to the user. The user interfaces 870, 15 may provide information in any number of desired languages, regardless of whether the information is provided audibly or visually.

The user interfaces 870, 15 can also provide/receive information to a user in a machine-readable format. In one exemplary embodiment of the present invention, for example, the user interface 870 of a mobile device 800 may send and receive messages using dual-tone multi-frequency (DTMF) tones. The mobile device 800 and host server 860 can be configured to send, receive, and process machine-readable data in any standard format (such as a MS Word document, Adobe PDF file, ASCII text file, JPEG, or other standard format) as well as any proprietary format. Machine-readable data to or from the user interfaces 830, 15 may also be encrypted to protect the data from unintended recipients and/or improper use. In an alternate embodiment, a user must enter a passcode to enable use of some or all of the functionality of the mobile device 800. Any other user interface feature may be utilized to allow a human or non-human user to interact with one or more devices operating in conjunction with the present invention.

The mobile device 800 may include any other suitable features, components, and/or systems. For example, the mobile device 800 may be configured to preserve the life of its battery by shutting off some or all of its components, such as a camera or microphone. Components can be selectively shut down in response to a security compromise event, as well as in response to a command from an authorized user or security authority. Alternately, the mobile device 800 can be configured to use its components excessively to drain the battery as quickly as possible, to, for example, limit the usefulness of the mobile device 800 to an unauthorized user.

The mobile device 800 may be configured to implement one or more security measures to protect data, restrict access, or provide any other desired security feature. For example, a mobile device 800 may encrypt transmitted data and/or data stored within or created by the device itself. Such security measures may be implemented using hardware, software, or a combination thereof. Any method of data encryption or protection may be utilized in conjunction with the present invention, such as public/private keyed encryption systems, data scrambling methods, hardware and software firewalls, tamper-resistant or tamper-responsive memory storage devices or any other method or technique for protecting data. Similarly, passwords, biometrics, access cards or other hardware, or any other system, device, and/or method may be employed to restrict access to any device operating in conjunction with the present invention.

The host server 860 communicates with mobile devices 800, authorized users, unauthorized users, security authorities, (insurance agencies in particular) and other entities to monitor and protect the mobile devices 800 from unauthorized use and to mitigate the harm associated with a security compromise event or attempted fraud. The host server 860 may comprise any number of separate computer systems, processors, and memory storage devices, as well as human operators (e.g., to answer calls from authorized users reporting the loss/theft of a mobile device) and any other suitable entity. The host server 860 may include, or be in communication with, one or more databases 880 storing information regarding authorized users and mobile devices 800 in order to monitor and track the mobile devices 800 and provide instructions to the mobile devices 800 in the event a security compromise event occurs.

For example, a database 880 may store a usage profile for a mobile device to allow software on the host server 860 to detect whether continued usage of the mobile device deviates from the usage profile by a predetermined threshold, or whether the mobile device has incurred a loss event resulting in a fault state within the mobile device 800. The host server 860 may also receive, process, and store (e.g., in the database 880) information from the mobile device 800. The host server 860 may handle any type of data in any format to achieve any purpose, such as receiving and processing environmental parameters captured by the mobile device to track the position and location of the mobile device 800 as discussed previously. The database 880 may also store location information that can be used to determine whether the mobile device 800 is operating in a valid location (e.g., "whitelisting" and "blacklisting" as discussed previously). The database 880 may also store neural network training data, wherein exemplary images of defects in mobile devices are correspondingly associated with identified defect classes, outputs or states. The neural network training data may be augmented or otherwise modified to improve accuracy of recognition of device defects. Further, database 880 may store results of analysis of the health and operation of mobile device 800, along with identifying information and historical operational information associate with mobile device 800. In this manner, operational analysis of the mobile device may be tracked and analyzed over time by server 860, and trends identified that may indicate pending failure of at least one component of mobile device 800.

Databases 880 in communication with the host server 860 may also store archived data from mobile devices 800 for recovery in the event the mobile devices 800 are lost or stolen, or the data on the mobile devices 800 is destroyed (e.g., by a virus or other malicious program). The functionality of the host server 860 may be performed automatically or semi-automatically, such as through software/hardware operating on one or more computer systems, and/or by one or more human operators.

The host server 860 may include one or more system processors 14 that retrieve and execute computer-readable instructions stored in a memory 16 to control (at least partially) the operation of the host server 860. Any number and type of conventional computer, computer system, computer network, computer workstation, minicomputer, mainframe computer, or computer processor, such as an integrated circuit microprocessor or microcontroller, can be used in conjunction with the present invention. Computer systems used in accordance with aspects of the present invention may include an operating system 43 (e.g., Windows NT/95/98/2000/XP/Vista/7/8/10, OS2, UNIX, Linux, Solaris, MacOS, etc.) as well as various conventional support software and drivers typically associated with computers. In certain embodiments, dedicated applications may be entirely or partially served or executed by the system processor to perform methods of the present invention.

The neural network 47 may comprise a convolutional neural network (CNN) architecture, and may be implemented through software stored in the memory device 16, through external hardware (such as hardware accelerators or graphics processing units (GPUs)) coupled to the server processor 14, or through a combination of stored software and external hardware.

The host server 860 may be accessed in any desired manner, such as through a website on the Internet, and/or through a telephone network. The host server 860 may include any number of human operators, computer systems, mobile telephones, mobile computing devices, interactive voice response (IVR) systems, and any other suitable system and device for communicating with a user, security authority, computing device, or other entity. The host server 860 can communicate with unauthorized users of a lost or stolen mobile device, both through the mobile device or through other communication methods, including direct communication with a fault state test application (alternatively, as used herein, "FSTA") installed on the mobile device. The host server 860 may notify the unauthorized user that the mobile device is lost or stolen, provide recovery information (such as a shipping address) to the unauthorized user, forward test result and damage claim information to a third party insurer, and facilitate initiation of an insurance claim. The host server 860 also communicates with the mobile device 800 to provide software updates, receive data for archival, identify files and other data to be protected, and to perform any other aspect of the present invention.

The host server 860 may be controlled by (locally or remotely), or operate in conjunction with any third party such as an authorized user, telecommunications service provider, mobile device monitoring/tracking service provider, security authority, an insurance agency, a mobile device repair agency, a mobile device seller, an advertising agent, a mobile device warranty reseller, an authorized user of the mobile device, and/or any other desired entity. For example, authorized users and security authorities may communicate with or through the host server 860 to interact with the fault state test application (FSTA) installed on mobile device 800 to confirm that the device has incurred a fault that may be subject to an insurance claim. The host server 860 may be configured to provide notifications on how to return a lost/stolen mobile device 800, detect a security compromise event, detect that a fault state has arisen on the mobile device, and determine whether a mobile device's functionality should be altered and (if so) determine the manner in which the functionality of the mobile device 800 should be altered. The host server 860 may operate in conjunction with any other desired systems, devices, human operators, or other entities.

The FSTA may gather information from the tested mobile device to be relayed to the third party or stored 45 in memory 16 of the server 860 along with the results of the device test. Device data 45 is uniquely associated with one or more images of the mobile device 46, which may be analyzed by the server processor 14. Device image data may be stored in any format, including, but not limited to jpeg, TIFF, GIF, EPS, PNG, PDF, scalable vector graphics, bitmaps, or any other conventional or nonconventional image data formats. The device data 45 and corresponding device images 46 may also be stored in the database 880. Any appropriate data may be included in the information relayed to the third party, such as a device type, a manufacturer, a model number, a serial number, a manufacturing date, a hardware configuration list, a memory capacity, a software manifest, a list of operable features, a list of inoperable features, an electronic serial number, an IMEI number, an international mobile equipment identifier number, an IMSI number, an international mobile subscriber identity number, a UIMID number, and a user identity module identifier, test results, and fault conditions. Mobile devices that utilize SIM cards (such as interchangeable Subscriber Identity Modules commonly used with cellular telephones) can be further used with embodiments of the present invention in determining that at least one of the stored device configuration parameters includes an IMSI number within a SIM of the device.

In an additional embodiment of the present invention, a user that has a mobile device with an alleged fault condition (such as a cracked screen/display) may be requested to install an application (such as the Fault State Test Application referred to above) on the allegedly faulty mobile device. The FSTA provides a trusted method to assess the veracity of a claimed fault condition on the mobile device (such as a cracked or damaged screen/display). The FSTA interacts with the mobile device's user to obtain sensor readings and user inputs that are utilized to assess whether the mobile device is in fact faulty. The determination of a fault/non-fault condition can then be displayed and/or sent to a third party (such as an insurance company that is being asked to provide policy coverage for the mobile device) in a secure manner (so that the test performed on the mobile device provides a trusted result). In one embodiment, the data sent by the FSTA in the mobile device is encrypted to prevent tampering or spoofing by the user of the mobile device, and is suitably decrypted by the recipient or software running within the server 860.

Embodiments of the present invention that test the mobile device also have wider purposes beyond testing mobile devices for fractured glass; for example: full digitizer could be tested as the screen is painted in full (as described more completely below). Further, a darkened display/screen could be tested by a point test (e.g. sensors might be working but the LCD could be broken). Likewise, to verify that the input from the user is accurate, in one implementation the user would not be able to see points to complete test whereas in normal paint mode, the user might try to paint full screen to fool test. Also, color could be tested; for instance, the user could be prompted to press the 2 displayed greens then press the two reds and finally press the 2 blues (for example). Further, analysis of an image captured of the mobile device, either in a mirror or by a second device, may provide captured image data that can be analyzed to visually determine fault classes, such as through a neural network such as a convolutional neural network. A wide variety of defects may be detected in this manner, including, for example, a crack or scratch in the display of the mobile device; a check, crack, chip, blemish, or break in a casing of the mobile device; a bezel crack; a wear point on a casing of the mobile device; a stuck or dead pixel on the display of the mobile device; LCD bleed in the display of the mobile device; a pink hue defect in the display of the mobile device; an object (such as a user's body part, a sticker, or other item) blocking the display of the mobile device; a detected aspect ratio of the mobile device screen not corresponding to an expected aspect ratio for the corresponding mobile device type; a wear pattern on the mobile device not corresponding to an expected usage profile of the mobile device; a reflection on the display of the mobile device; a smudge on the display of the mobile device; a logo or other identifier found in the image of the mobile device not corresponding to an expected manufacturer of the mobile device; a seam separation on the mobile device; a missing component on the mobile device; and any other type of defect that may be determined from an image captured of the mobile device.

Further, in one embodiment, a company that sells mobile devices may want to know immediately if a device in the field has incurred a fault condition (such as a cracked display) so that a new model can be offered to the device owner. This may be especially relevant in the case where a Mobile Network Operator (MNO) offers devices for sale that are subsided by the payment of the service plan's monthly fees over a contractually-obligated period of time— the MNO benefits because they can renew and extend the service agreement, and the device manufacturer benefits because they can sell new devices to replace faulty ones. Additional or alternate system implementations of embodiments of the present invention include:

- Mobile Device Insurance: embodiments of the present invention provide for verification of phone condition in the second-hand mobile device insurance market, as well as providing the capability to support selective insurance or variable policy provisions related to provable state/functionality of the mobile device hardware (e.g. screen not cracked results in full insurance for mobile device, but a cracked screen but otherwise functional device may allow for a policy to cover the device except for glass damage). Likewise, embodiments of the present invention provide for verification that the phone being checked is the one being insured (e.g. through transmission of mobile device ID information such as IMEI information or other data described herein as part of the test). Further, embodiments of the present invention may be used in identifying that the mobile device is the correct device under warranty before it is returned for repair of screen to reduce spurious claims. Such may occur, for example, for an insured device, when a repair company doesn't really repair a broken device, but instead fraudulently splits insurance payout with a person whose phone was insured.
- Mobile Device Transfer: Embodiments of the present invention may be utilized to validate that the phone that was tested is the one actually handed over in a transfer of possession/ownership.
- Lease Return State Verification: aspects of the present invention provide for determination of condition for lease return (for example, if a leased mobile device must be returned at end of lease, if the condition of the mobile device has fallen below a predetermined agreed-upon state (i.e. display must not be cracked at time of lease return) then the customer must pay an additional fee for the excessive wear/damage).
- Purchase/Shipping State Verification: The FSTA could be used for verification by a consumer buying the device online (for example, through eBay) where the seller is not completely trusted. Also, the FSTA could be used to ascertain a current level of damage i.e. the display may be cracked but to what extent (in various embodiments it is anticipated that a consumer or company would pay additional money as the know screen condition is not too badly damaged as to become unacceptable). Additionally, embodiments of the present invention provide proof by a warehouse that the mobile device was in acceptable condition when it was dispatched. When the FSTA is used a verifier in the situation where a person is purchasing a used mobile device from another source, the buyer may request the seller install a trusted screen verifier app, put the buyer's email address or SMS number in the FSTA to provide confirmation, the FSTA runs the test and sends the results to the buyer, thus verifying the used device does not have known faults (such as a cracked screen). Further this might be desired by the seller, who wants to verify before shipping, that the device is operating as expected, so that they are not accused of sending a faulty device to the recipient.
- Legal Status Determination: Aspects of the present invention may support collaboration with third parties (or a police database) in confirming that the mobile device is not lost/stolen/subject to outstanding charges.

There are several embodiments provided for herein to perform the fault state assessment, including the FSTA conducting a pressure sensor-based test, a magnetometer-based test, or a pixel-based test, along with several system-based use scenarios presented; while each type of FSTA test is intended to be able to determine a crack individually, the various types of crack detection approaches may be combined as desired for any purpose, such as increased accuracy. While in a preferred embodiment, the FSTA may be installed in and run resident within the mobile device, those of skill in the art may appreciate that the FSTA may be executed in other manners, such as an OTA (over the air) application; deployed through a website and side loaded to a connected mobile device; loaded through a piece of in-store hardware (e.g. raspberry pie) or purpose-built instore device; or loaded and executed from a mall or store vending machine. Further, all or part of the FSTA and system implementation embodiments may be included in a library of apps utilized by entities that provide online quotes for insurance, device trade in, or mobile device diagnostics.

Pressure Sensor Based Test:

In mobile devices equipped with pressure sensors, the FSTA is configured to obtain pressure sensor readings from touches to the display of the mobile device. By prompting the user to touch certain areas of the screen, simultaneously touch multiple areas of the screen, or drag touches across multiple areas of the screen, (or any other desired combination) the FSTA can obtain a collection of pressure measurements from the touches and determine whether the display/screen is cracked. While typically a user's finger press causes a "touch" to occur, those of skill in the art appreciate that in embodiments of the present invention, any body part or mechanical stylus may be used in addition to or in replacement for a finger when executing a "touch" to the display.

Figure 1:
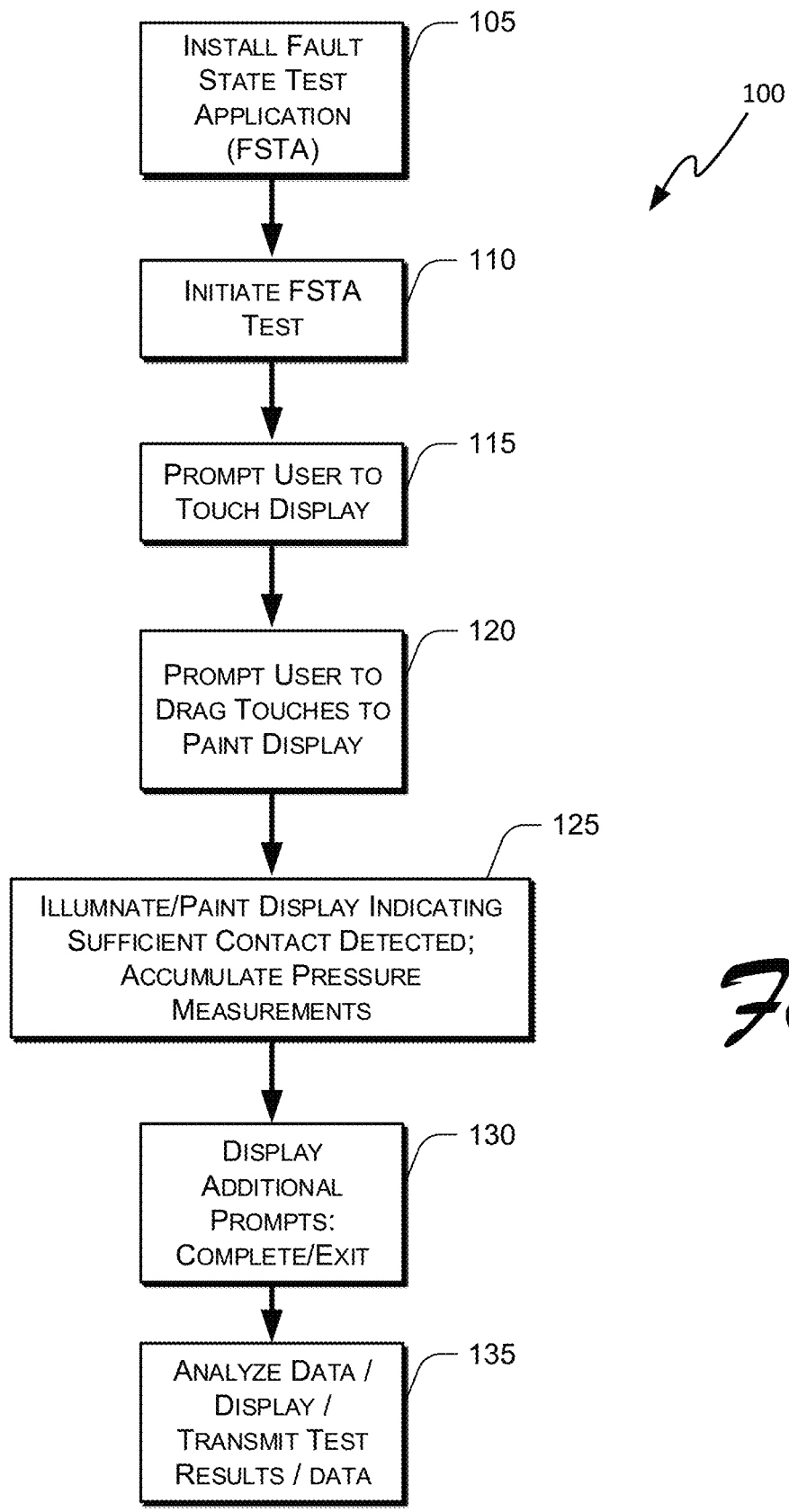
FIG. 1 illustrates a flowchart of an exemplary method of the present invention.
Figure 2:
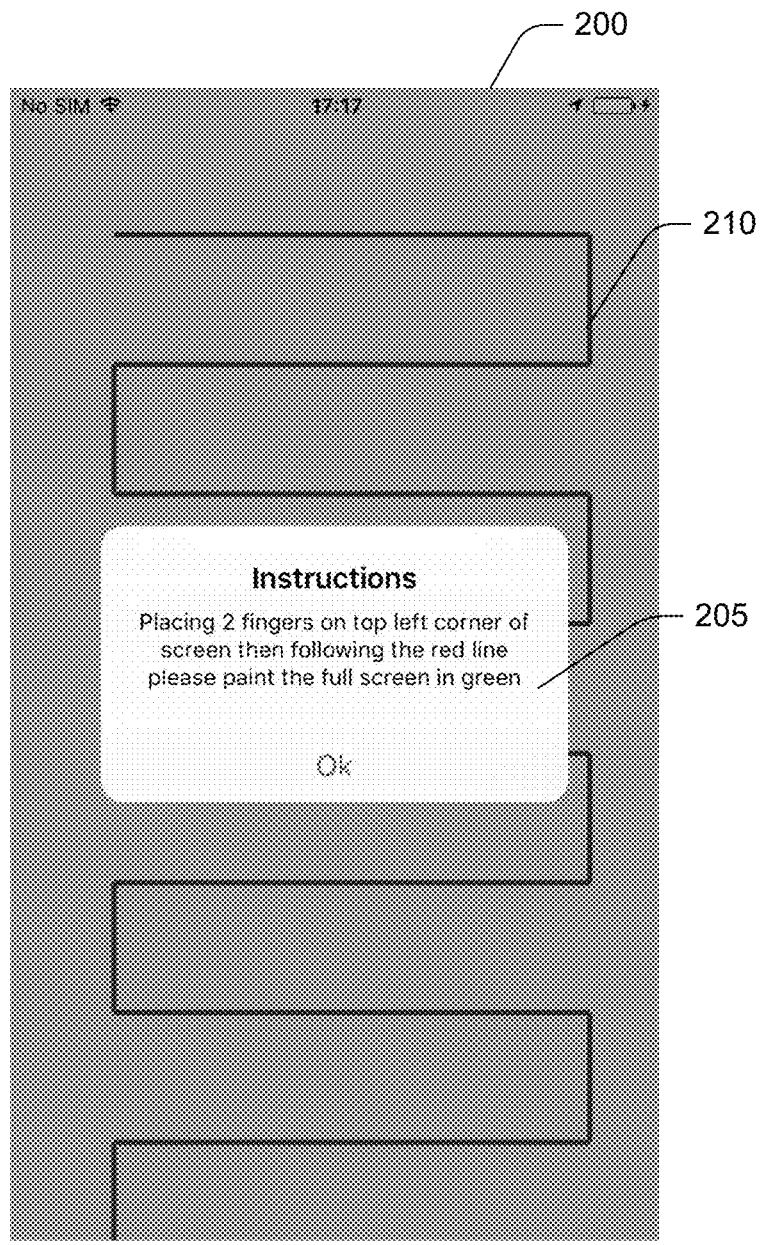
FIG. 2 depicts an exemplary display of a mobile device with instructions and prompts to the user.
Figure 3:
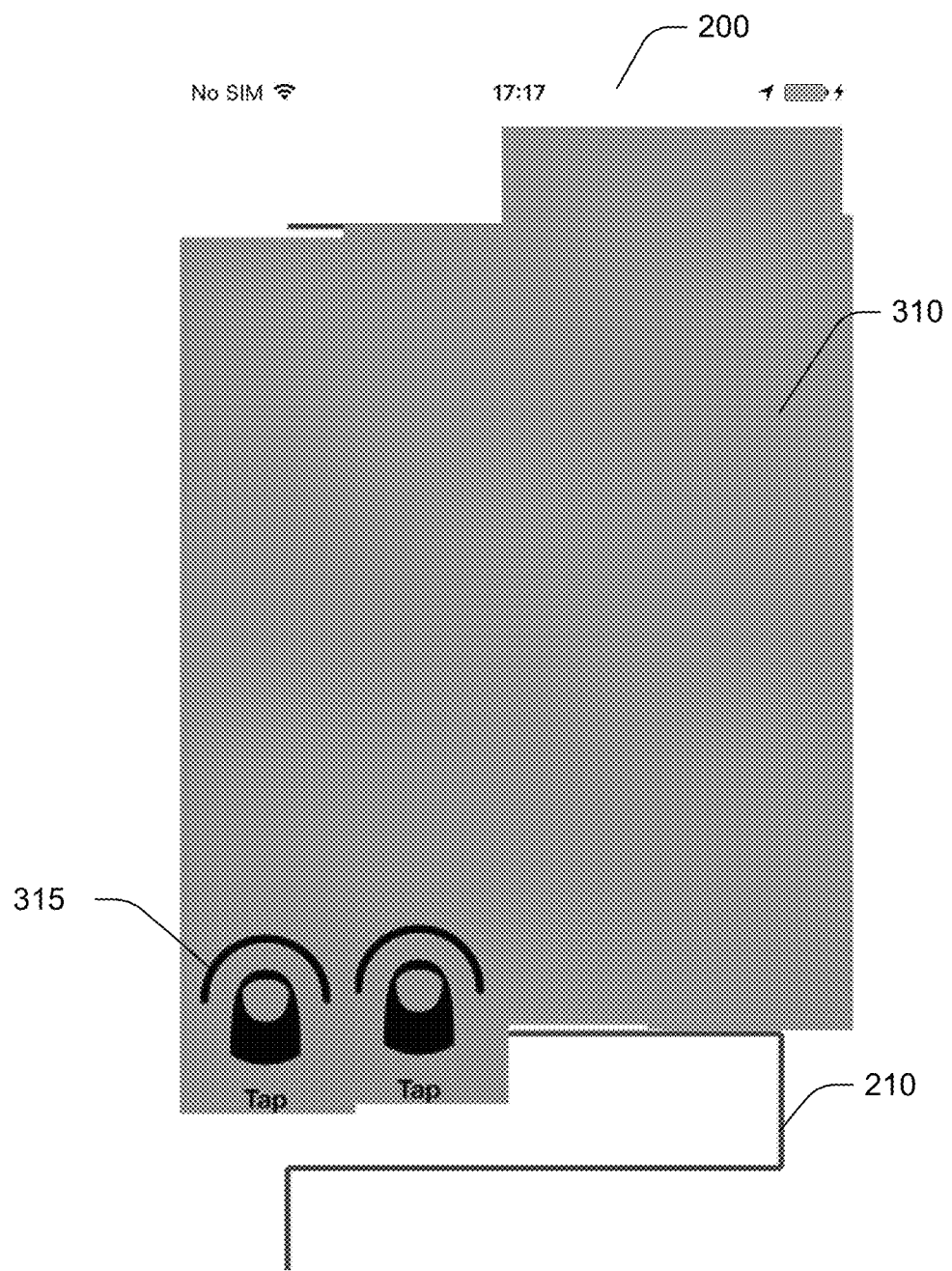
FIG. 3 depicts another exemplary display of a mobile device with instructions and prompts to the user.

In one preferred embodiment 100 shown in FIG. 1, the user executes 110 the FSTA app (after installation 105, if the app had not already been installed), and the user is prompted 115 by the FSTA to touch two fingers to the display, either left finger first then right finger, or right finger first then left finger, or both approximately simultaneously, as may be desired in obtaining the most appropriate pressure readings. The FSTA detects the pressure readings for each touch zone, and the test continues by prompting 120 the user to drag the two fingers across the screen to "paint" the screen, as FSTA displays illumination 125 on the display when it has detected touches of sufficient measured pressure in the areas. The user may be prompted to simply drag both fingers in any direction until the entire screen is "painted" by the FSTA app (after it detects all areas of the screen have received the appropriate drag touches) or preferably, to follow a particular path in "painting" the screen with the two finger touches. FIG. 2 shows an exemplary display 200, with a prompt 205, and a pattern 210 for the user to follow in "painting" the display 200. While a serpentine pattern is shown, alternative patterns may be used depending on the mobile device type, the pressure sensor configuration, or other factors. FIG. 3 shows a partially "painted" display 200 with the pattern 210 for the finger touches, and color 310 filling the display 200 where the two finger touches 315 had followed the pattern

Figure 4:
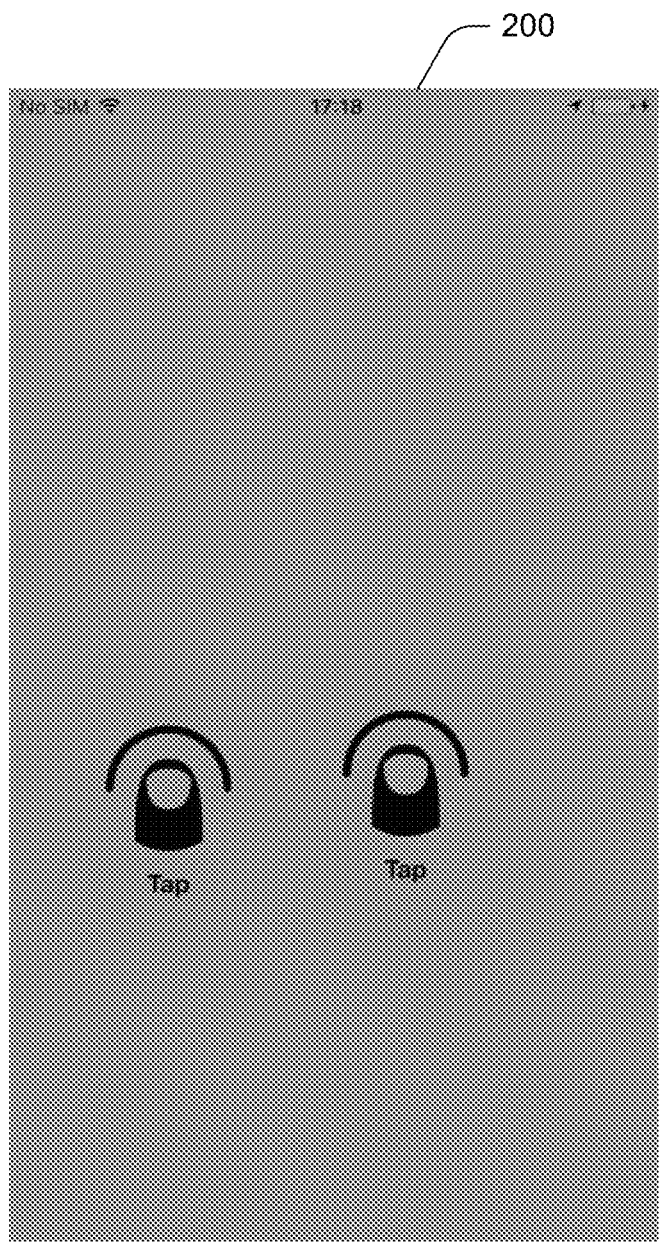
FIG. 4 illustrates one aspect of a display of an exemplary mobile device of the present invention that had been successfully and completely painted.

210. FIG. 4 shows one aspect of a display 200 that had been successfully and completely painted, with all areas of the pattern prompt 210 covered. While embodiments shown herein show a completely painted display as an exit criterion, various embodiments anticipate the possibility of painting just a portion of the display, painting no parts of the display, or halting the test as soon as a fault condition (e.g. a crack) is detected without painting or covering the entire display.

Alternatively or in combination, the FSTA may present the prompts in a game-like manner, prompting the user, for instance to drag the fingers to move one displayed object toward another (for example: moving an image of a rabbit toward a carrot, or helping someone through a maze like a kids puzzle, or pressing and sliding the blocks into the right order to complete a picture), or to "capture" an item moved across the display, thus prompting the user to touch the desired sections of the screen. Alternatively, or in combination, more than two fingers may be used simultaneously on the display, such as three or four fingers placed on the display significantly spaced apart, then dragged together toward a prompted location.

The FSTA monitors the progress of the user in completing the test, and if necessary, prompts the user 130 to complete or end the test. Once the test is complete, the FSTA analyzes the accumulated pressure data to attempt to determine anomalies such as touch pressure reading changes that indicate that predetermined thresholds have been met for determining that a crack may be present in the display 200. In one embodiment, when a pressure reading of one of the touched areas falls off by more than a predetermined threshold, a display anomaly such as a crack may be determined to be present. In various embodiments, the predetermined fall-off thresholds may comprise 5%, 10%, or 50%). In other embodiments, when pressure from one finger touch falls to less than a predetermined amount of its previous value, a discontinuity in the display is likely (in one example, the predetermined amount may be 10% or 50% of its average reading). In yet another embodiment, the difference in pressure readings between finger touches is compared over time, and if the difference between the pressure readings varies more than a predetermined difference threshold, a crack may be determined to be present within the display. In yet another embodiment, a drop then rise in pressure readings from at least one of the finger touches may indicate the presence of a crack in the display. In a further embodiment, a rise then drop in pressure readings from at least one of the finger touches may indicate the presence of a crack in the display.

Figure 5:
FIG. 5 shows a display of an exemplary mobile device of the present invention with an indication that a crack has been detected in the display.
Figure 6:
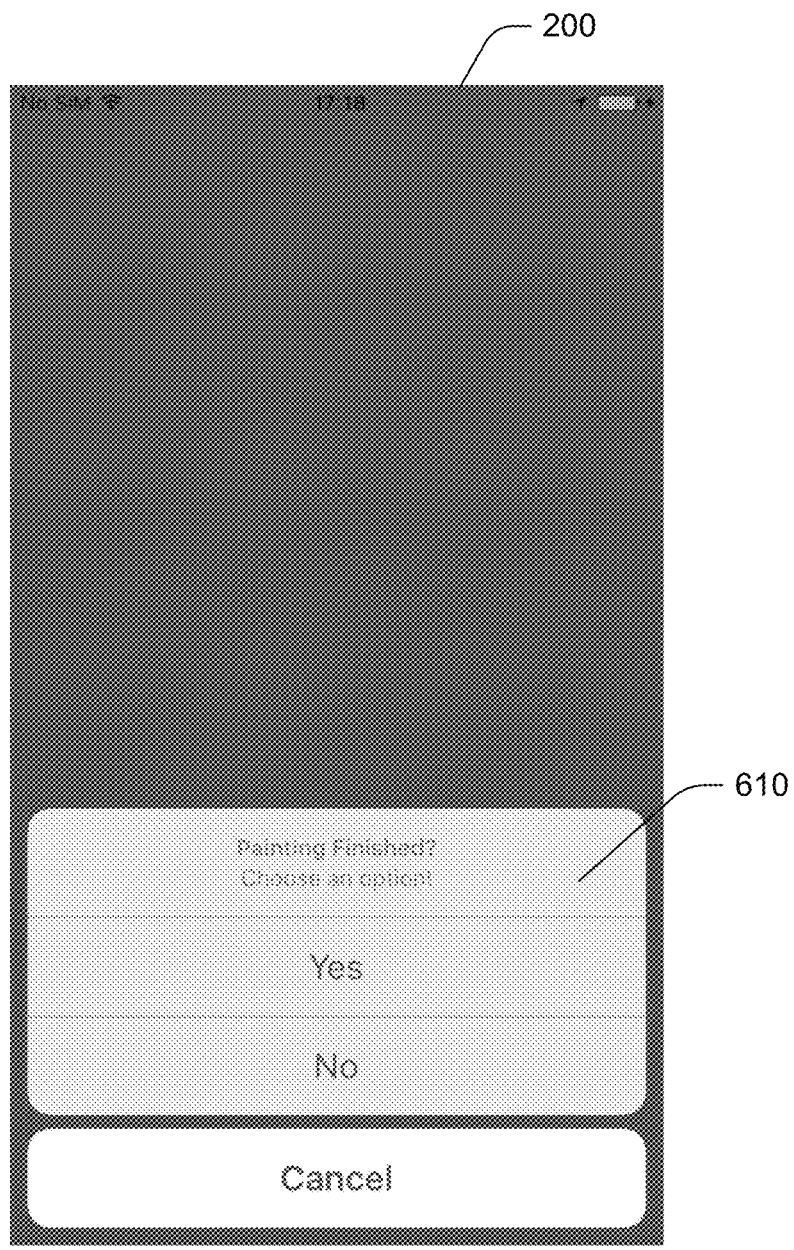
FIG. 6 shows one embodiment of a display of a mobile device of the present invention, where the user is being prompted to end or continue the test.

After analysis is complete, the appropriate test result is displayed 135 and/or transmitted (optionally, along with mobile device ID information and accumulated test data) to a central server 860 and/or to a third party, such as an insurance agency, a mobile network operator, a mobile device manufacturer, or to any entity for which fault states of the mobile device are of importance. In one embodiment, FIG. 5 shows an indication 510 that a crack has been detected in the display. FIG. 6 shows one embodiment, where the user is being prompted 610 to end or continue the test.

As mentioned above, while the user is making the prompted movements as described, the FSTA accumulates and stores pressure data for each of the touched (or swiped/dragged) zones over time. In doing so, the FSTA can use predetermined methods to analyze anomalies in the accumulated pressure measurements that may indicate the presence of one or more a cracks in the display of the mobile device. For example, in the case of mobile devices with pressure-sensitive displays (such as certain iPhone models), the FSTA may record and identify significant pressure drop-off anomalies when the finger pad passes a discontinuity in the screen (such as a crack). The FSTA may then take the appropriate action to report status to the user, and alternatively to the outside entity as mentioned above.

Magnetometer-Based Test.

In another embodiment, the mobile device 800 includes a magnetometer that may be accessed by the FSTA to accumulate magnetometer readings, and in conjunction with prompted touches by the user of the mobile device, the FSTA may detect fault conditions such as screen cracks that arise from pressure changes sensed by the magnetometer when the user presses certain areas of the screen. While typically a user's finger press causes a "touch" to occur, those of skill in the art appreciate that in embodiments of the present invention, any body part or mechanical stylus may be used in addition to or in replacement for a finger when executing a "touch" to the display.

Figure 7:
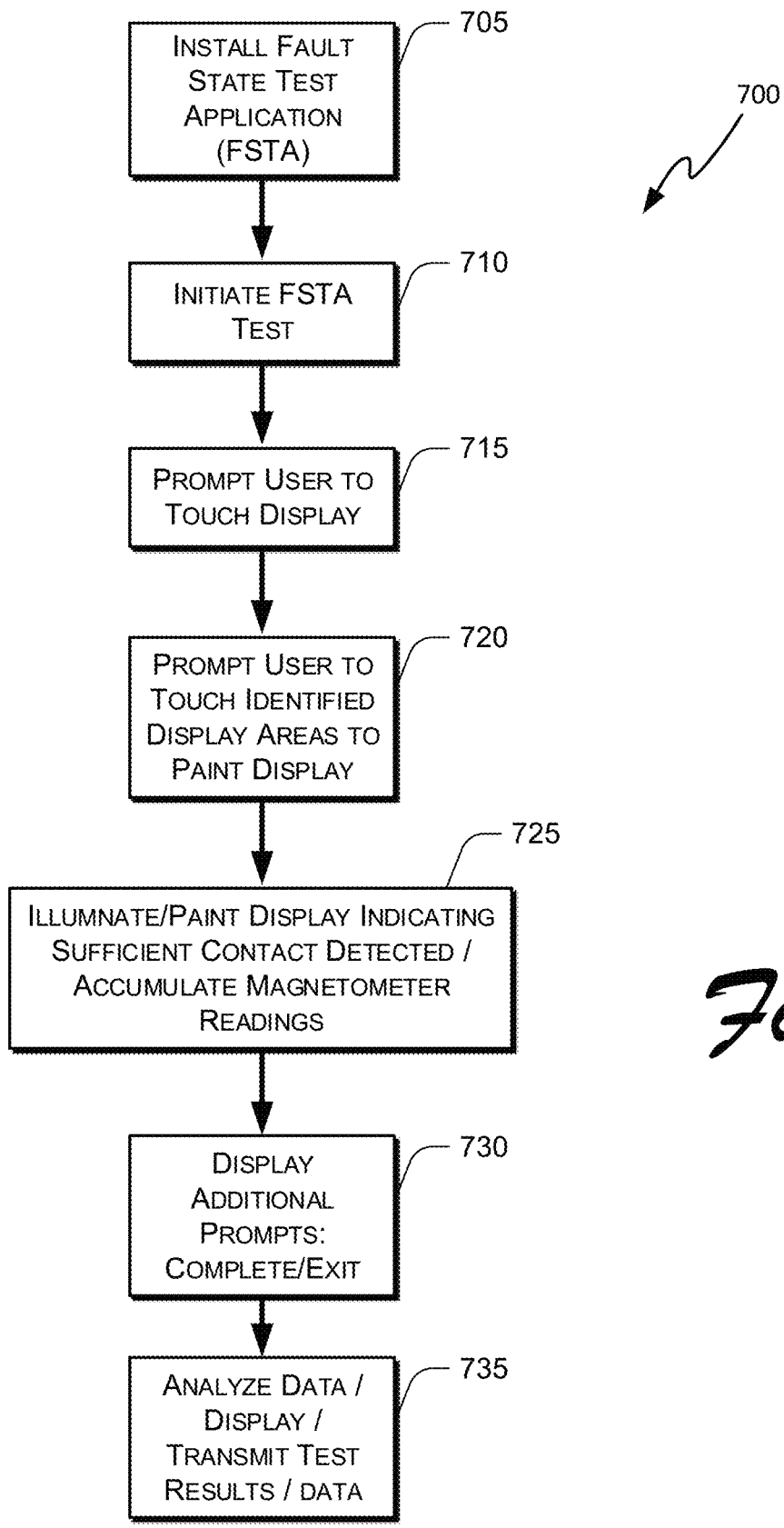
FIG. 7 illustrates a flow chart depicting a preferred embodiment of the present invention.

In one preferred embodiment 700 shown in FIG. 7, the user executes 710 the FSTA app (after installation 705, if the app had not already been installed), and the user is prompted 715 by the FSTA to touch (see also FIG. 9, 905) the display 200, with a pattern presented to the user (see also FIG. 9, 910) that will need to be filled in from discrete finger touches, as prompted 720 by the FSTA. In this embodiment, the FSTA will measure and accumulate magnetometer readings as each prompted area 905 is pressed by the user, and if sufficient pressure is applied, each individual area of the display 200 is "painted" 725 to provide user feedback (see FIG. 10, showing partially painted section 1005, and unpainted part of pattern 910). While painting the display, the FSTA detects and accumulates the magnetometer readings for each touched zone 725, and the test proceeds until a predetermined amount of the display 200 has been painted. In various embodiments, substantially all of the screen will be required to be "painted"; in alternate embodiments, a subset of the screen area will need to be painted, and in an additional embodiment, the test only continues until the magnetometer readings indicate that a crack has been detected.

Figure 9:
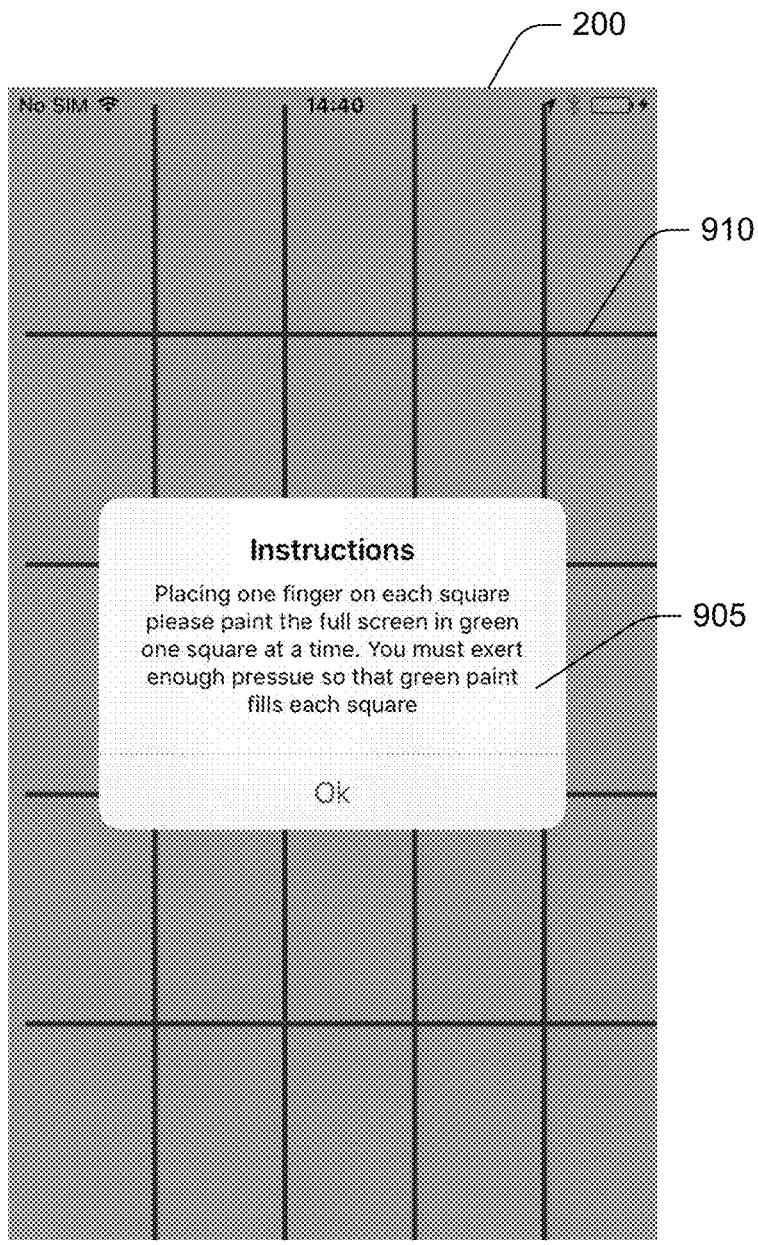
FIG. 9 shows an exemplary display of a mobile device of the present invention, with a prompt and a pattern for the user to follow in "painting" the display of the mobile device.
Figure 10:
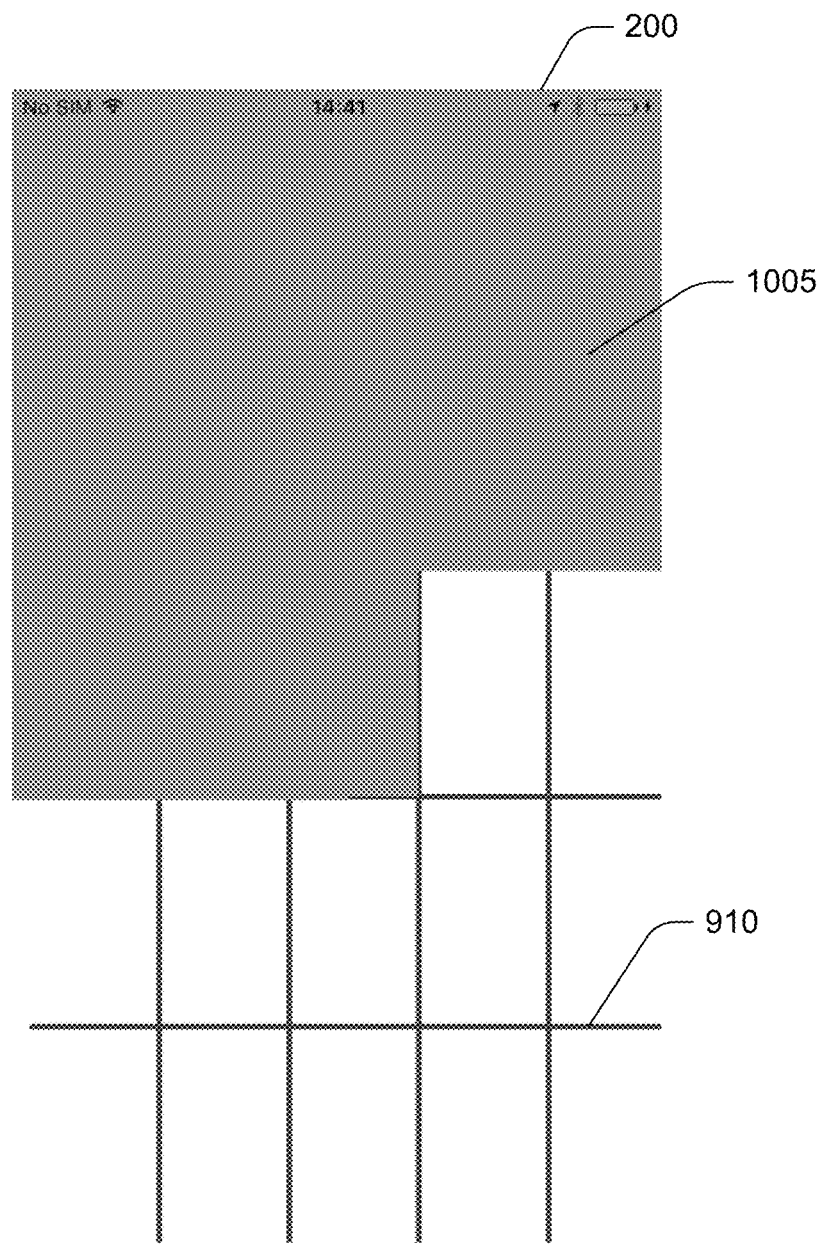
FIG. 10 shows an exemplary display of a mobile device of the present invention, with a partially "painted" display.
Figure 11:
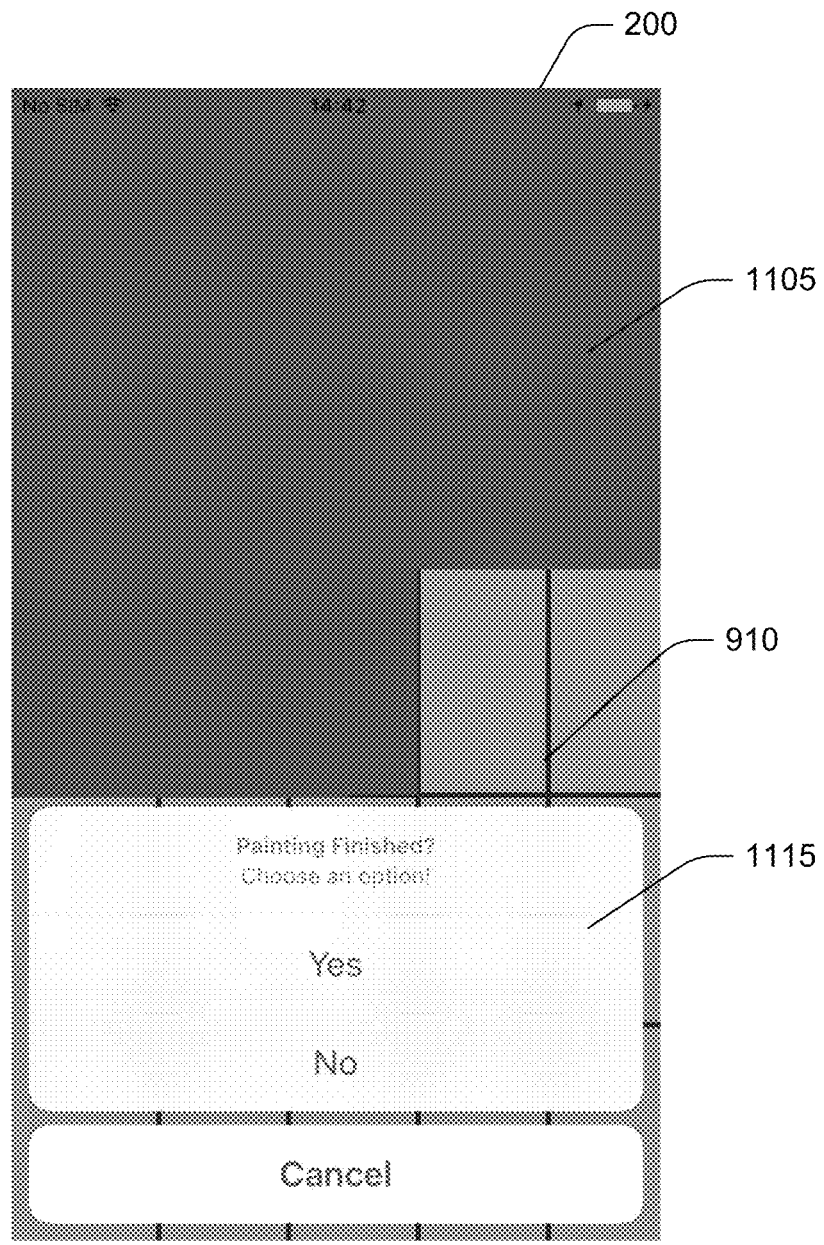
FIG. 11 shows an exemplary display of a mobile device of the present invention, where, in one aspect, the display had been partially painted.
Figure 12:
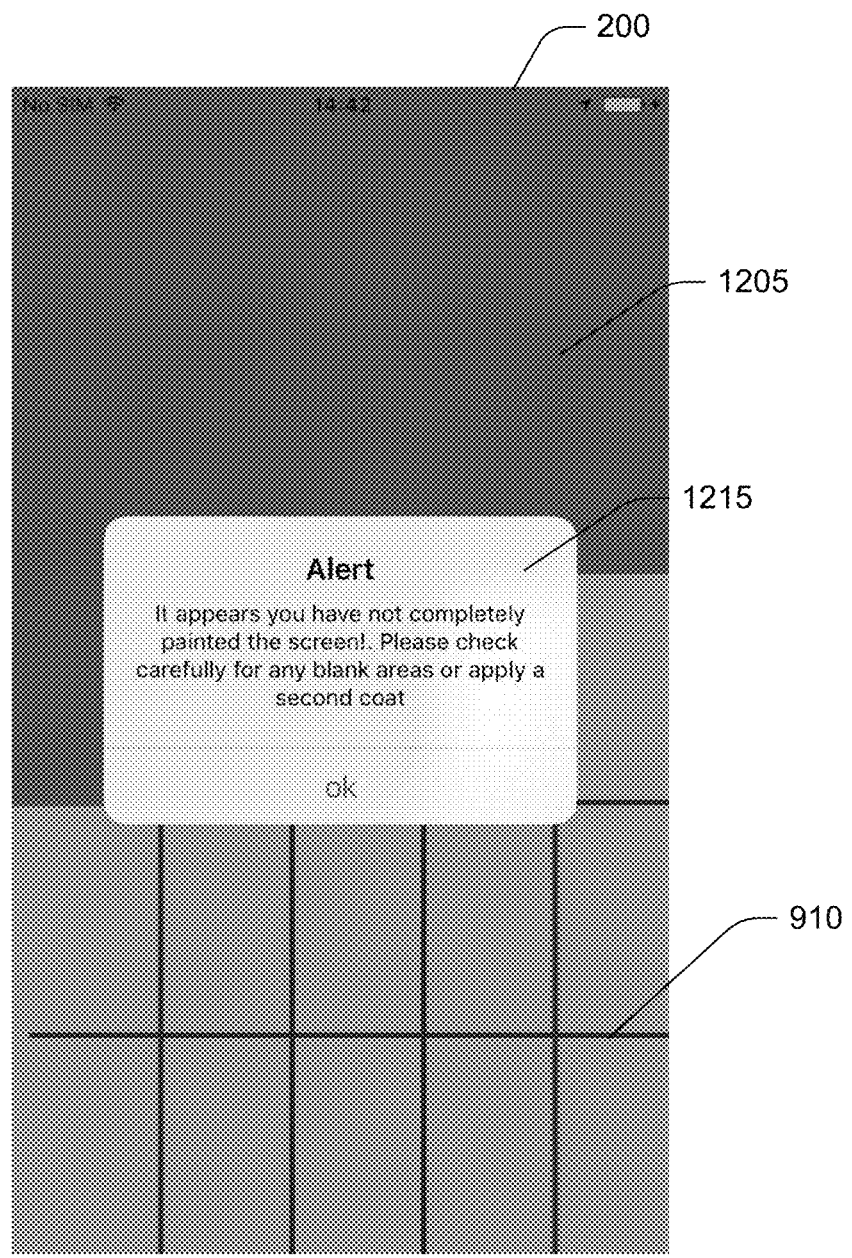
FIG. 12 shows an exemplary display of a mobile device of the present invention; where in one aspect a prompt is presented to the user.
Figure 13:
FIG. 13 shows an exemplary display of a mobile device of the present invention, wherein one aspect a prompt is presented to the user.

FIG. 9 shows an exemplary display 200, with a prompt 905, and a pattern 910 for the user to follow in "painting" the display 200. FIG. 10 shows a partially "painted" display 200 with the pattern 910 denoting the remaining finger touch areas to be completed, and color 1005 filling the display 200 where finger touches had been registered with sufficient pressure. FIG. 11 shows one aspect of a display 200 that had been partially painted 1105, with a prompt 1115 asking the user whether they have completed painting the defined grid area 910. FIG. 12 shows that if the user selected the option that they had completed the painting, and if the defined 910 had not been sufficiently completed to paint the necessary areas (partially shown in 1205), then a prompt 1215 is presented allowing the user to start over or to finish touching the defined grid areas. FIG. 13 then shows one embodiment of information presented 1315 on the display 200, indicating that a crack has been detected.

While embodiments shown herein show a completely painted display as an exit criterion, various embodiments utilizing the magnetometer reading approach anticipate the possibility of painting just a portion of the display, painting no parts of the display, or halting the test as soon as a fault condition (e.g. a crack) is detected without painting or covering the entire display. Also, in various embodiments herein, once a crack condition is detected, the mobile device may be configured to prompt the user to take a photograph of the device in a mirror (with its own forward-facing camera) to document the state of a crack in the mobile devices' display.

Alternatively or in combination, the FSTA may present the prompts in a game-like manner, prompting the user, for instance, to press various sections of the screen to achieve a game objective, or to "wall in" an item moved across the display, thus prompting the user to touch the desired sections of the screen. Alternatively, the magnetometer reading embodiments may be used in combination with the pressure sensor approaches described above to improve accuracy or shorten the duration of the test to determine whether a crack is present in the display.

Returning to FIG. 7, the FSTA monitors the progress of the user in completing the test, and if necessary, prompts the user 730 to complete or end the test. Once the test is complete, the analysis 735 of the magnetometer data is conducted to determine whether a crack is likely present in the display, and an appropriate test result is displayed 735 and/or transmitted to a central server 860 and/or to a third party, such as an insurance agency, a mobile network operator, a mobile device manufacturer, or to any entity for which fault states of the mobile device are of importance.

While the user is making the prompted presses as described above, the FSTA accumulates and stores magnetometer data for each of the touched zones in the defined touch areas (such as the grid 910) over time. In doing so, the FSTA can use predetermined methods to analyze anomalies in the accumulated magnetometer measurements that may indicate the presence of one or more a cracks in the display of the mobile device. For example, a deviation or change in magnetometer readings of more than a predefined percentage (for example, 5%, 10%, or 50%) between two or more accumulated magnetometer readings may indicate a crack is present in the display. The FSTA may then take the appropriate action to report status to the user, and alternatively to the outside entity as mentioned above.

Pixel Test.

In one embodiment, a user interactively verifies that a crack exists in a screen of the mobile device by interacting with an application in the mobile device to indicate when one or more pixels are not illuminating correctly. To verify that the user is providing correct information, the application may provide information that requires negative responses as well as positive responses in order to correctly assess the state of the device. For example, in one embodiment, the screen could be partitioned or tessellated into regions, and the application could attempt to illuminate each screen section (with varying colors, if desired), and ask the user to press any sections that do not show evenly lit pixels within each respective section. The areas indicated by the user as having unevenly lit pixels could then be tessellated into smaller regions, and the interaction repeated until a suspect region is identified to a sufficiently small size. The application can then provide prompt such as "Please watch for a green pixel being displayed," and then asking the user to click when the user saw it. If no press occurs after a predetermined period of time, then the area is assumed to be nonfunctional. Further, to determine the veracity of the user's inputs, a pixel can be presented to a "known good" area of the screen (one that the user had previously indicated during the tessellation test was active and functional) and if the user does not press the response pad that they affirmatively saw the pixel, then the user's inputs can be judged to be suspect. This process may be used iteratively determine not only the veracity of the user's inputs, but could be used to map out to high accuracy the extent of any nonfunctional areas of the screen. This embodiment makes this possible by allowing the "edge" of known good areas to be determined where the user provides a response as seeing the illuminated pixels, and areas where no illumination was seen. Additional pixel verifications can be conducted to determine whether any faulty areas "move" with additional pixel tests with random (or slightly displaced) locations on the screen, thus assessing the veracity of the user's claim that an area of the display is faulty (e.g., cracks don't "move," although they may grow larger).

Thus, cracked areas, stuck or dead pixels, or faulty display interfaces can be mapped out and used to assess costs of mobile device repair/replacement, or to determine the applicability of an insurance claim, or for any other desired purpose. In one additional embodiment, a second mobile device is utilized with an FSTA installed upon it that synchronizes with the FSTA installed on the first suspect mobile device (such as through a Bluetooth pairing). In this scenario, the second mobile device's camera is used to photograph or video the display of the suspect mobile device to assess whether pixels (and/or regions) that are attempted to be displayed on the suspect mobile device are or are not visible; as such, a full test of the screen can be automated and a rapid determination made as to the areas of the screen/display that are or are not faulty without relying upon a user to provide the necessary (and accurate) inputs.

Detection of Device Defects Through Neural Network

Embodiments of the present application utilize Convolutional Neural Network (CNN) architectures to analyze captured images, videos, and/or audio files from mobile devices to identify defects and to provide analytical information such as heat maps in assisting with the further analysis of defect types. Those of skill in the relevant arts understand that many different CNN architectures may be used to implement aspects of the present invention. One exemplary CNN architecture may be realized through an Inception model implemented with Tensorflow™, and explanatory examples are provided, for instance, at https://www.tensorflow.org/tutorials/image_recognition. Alternative implementations of the present invention may be implemented through a Deep Residual Network (an explanation available at https://blog.waya.ai/deep-residual-learning-961), and or through Convolutional Network architecture implemented in environments such as Torch (examples and explanatory text provided at http://torch.ch/docs/tutorials.html). Background introductions for neural network architectures in general, and Convolutional Neural Networks (CNNs) in particular are also provided in Michael A. Nielsen, "Neural Networks and Deep Learning", Determination Press, 2015 available at http://neuralnetworksanddeeplearning.com.

In general, CNNs are one type of model architecture that has been successfully used for image classification tasks. CNNs apply a series of filters to the raw pixel data of an image to extract and learn higher-level features, which the model can then use for classification. CNNs typically contain three components: (1) Convolutional layers, (2) Pooling layers, and (3) Dense/fully connected layers.

Convolutional layers apply a specified number of convolution filters to the image. For each identified subregion within the image, the convolutional layer performs a set of mathematical operations to produce a single value in the output feature map. Convolutional layers then typically apply a ReLU activation function (a Rectified Linear Unit), to the output to introduce nonlinearities into the model;

however, in various embodiments logistic sigmoid functions or hyperbolic tangent activation functions may also be utilized.

Pooling layers down-sample the image data extracted by the convolutional layers to reduce the dimensionality of the feature map in order to decrease processing time. Practically, a pooling function replaces the output of the net at a certain location with a summary statistic of the nearby outputs. A commonly used pooling algorithm is max pooling, which extracts subregions of the feature map, keeps their maximum value, and discards all other values, thus reporting the maximum output within a rectangular neighborhood. Other possible pooling functions include the average of a rectangular neighborhood, the L2 norm of a rectangular neighborhood, or a weighted average based on the distance from the central pixel.

Dense (fully connected) layers perform classification on the features extracted by the convolutional layers and the down-sampled by the pooling layers. In a dense layer, every node in the layer is connected to every node in the preceding layer.

As introduced above, a CNN is composed of a stack of convolutional modules that perform feature extraction, and each module consists of a convolutional layer followed by a pooling layer; the last convolutional module is followed by one or more dense layers that perform classification. The final dense layer in a CNN contains a single node for each target class in the model (all the possible classes the model may predict), with an activation function for each node. The CNN allows interpretation of the values for a given image as relative measurements of how likely it is that the image falls into each target class. In various embodiments of the present invention, a target class may comprise a defect in a mobile device such as a crack in a display, a blemish or crack on a casing, LCD bleed on the display, pink hue on the display, stuck pixels on the display, and various combinations of the above.

Figure 14:
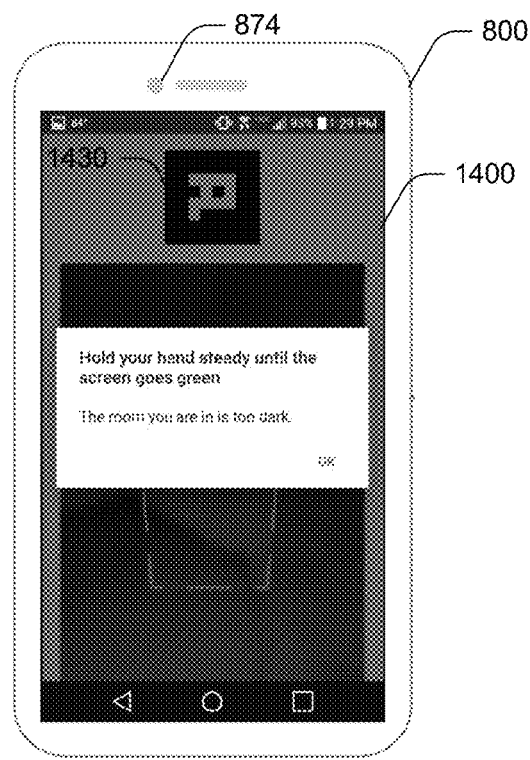
FIG. 14 shows an exemplary display of a mobile device of the present invention, wherein a prompt is presented to the user to hold still.
Figure 15:
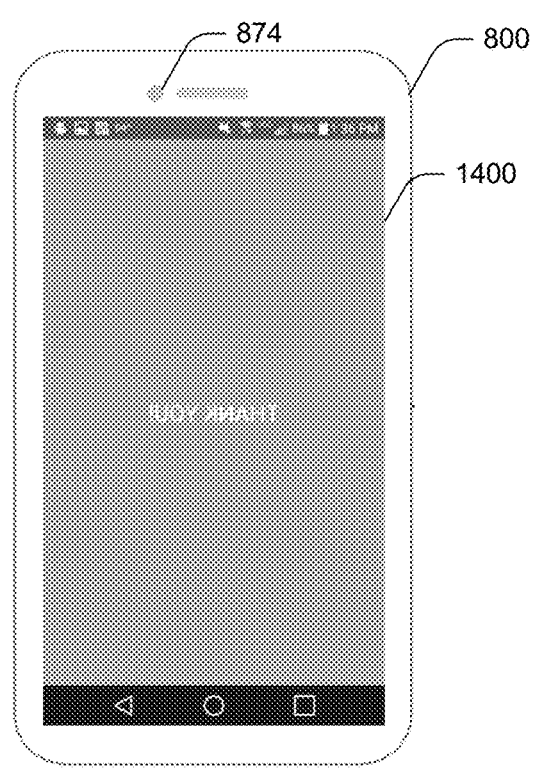
FIG. 15 shows an exemplary display of a mobile device of the present invention, wherein a prompt is presented to the user indicating that capture has been completed.

In one embodiment using a neural network analysis approach, systems and a methods are provided to identify a crack or other kind of defect associated with a mobile device through image analysis. Referring to the process 1600 illustrated in FIG. 16, an FSTA is installed 1610 on the mobile device that is desired to be tested 800 (also shown in FIGS. 14 and 15 with user prompts and guidance for capturing an image of the mobile device in a reflective surface such as a mirror). When ready, the user of the mobile device 800 initiates the device defect test 1615. Through a process discussed in regards to FIG. 17, an image of the display of the mobile device 800 is captured 1620, and the captured image is optionally pre-processed 1625 by rotating the image to a portrait mode and/or fine rotating to reduce skew, and/or cropping the image to a desired aspect ratio. The captured (and optionally pre-processed) image is then uploaded 1630 to a server (such as server 860), and as discussed further in regards to FIG. 18, the uploaded image is processed 1635 to determine whether any cracks or other types defects are present. Alternatively, or in combination, the extent and characteristics of the screen cracks or defects are characterized by the processing step 1635 for further analysis and reporting. Once the analysis 1635 of any potential defects is complete, the resulting information is formatted 1640 for presentation, storage, or display to any user for any necessary purpose, such as for assessment of whether the mobile device 800 is in proper working condition. The process then exits 1645.

Figure 16:
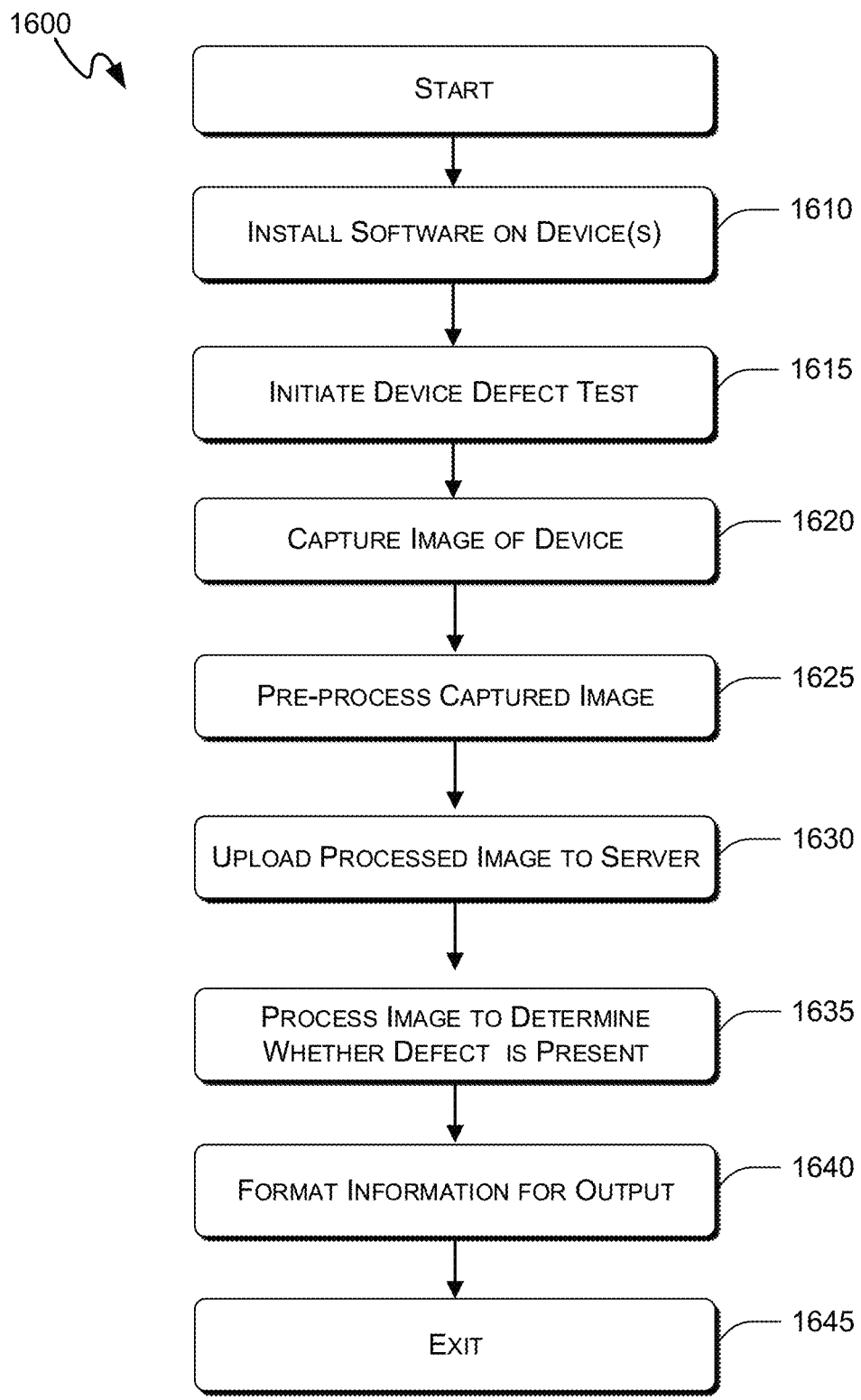
FIG. 16 shows a process flow diagram of the present invention, illustrating image capture and analysis to identify device defects.
Figure 17:
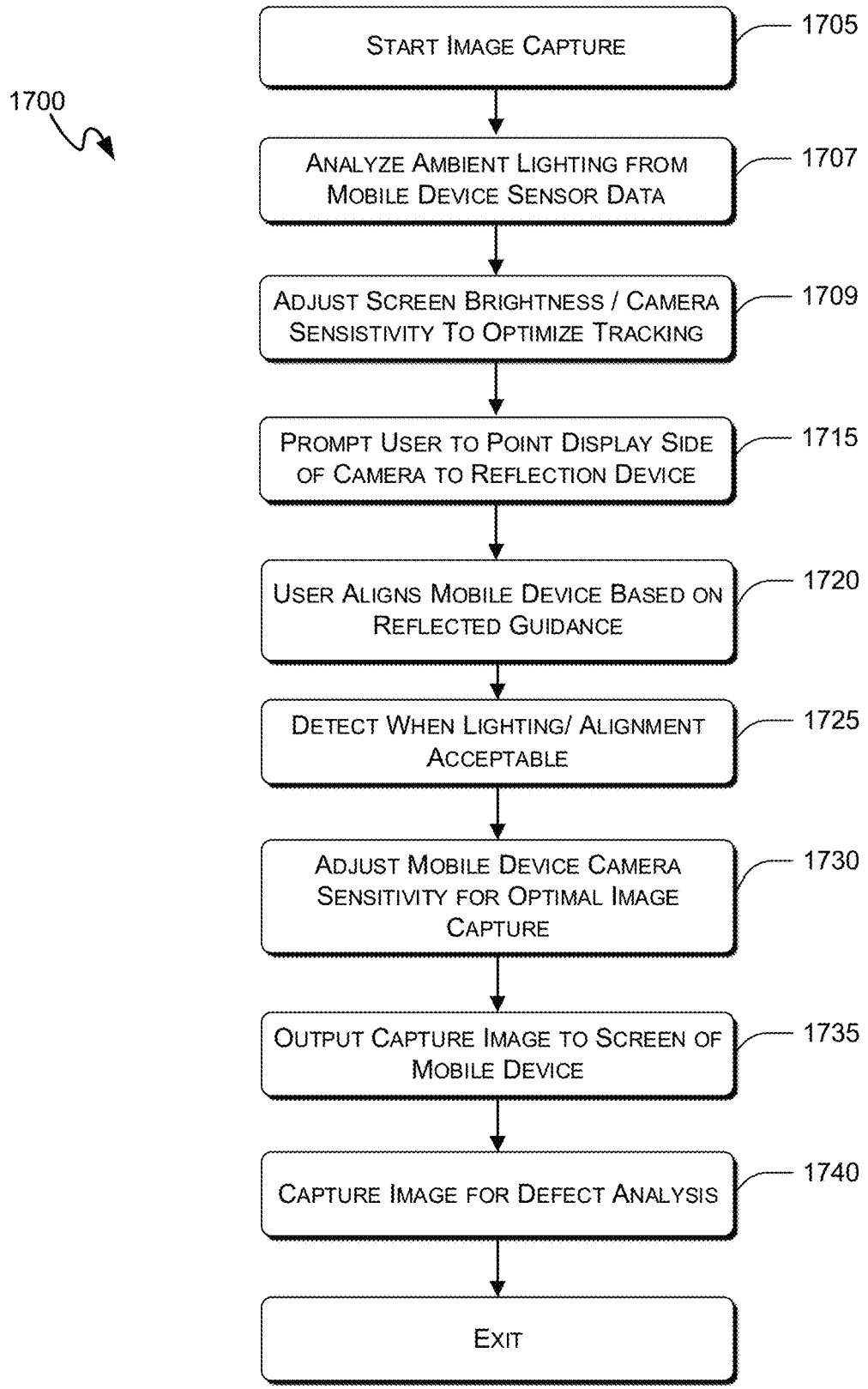
FIG. 17 illustrates a process flow diagram of the present invention, providing more detail of an exemplary image capture process.

FIG. 17 depicts a process 1700 of the present invention for capturing an image of the mobile device, as introduced in FIG. 16 step 1620. The image capture process begins 1705, where the FSTA analyzes ambient lighting 1707 from a light sensor within the mobile device 800. Then 1709, screen brightness and camera sensitivity of the mobile device 800 are adjusted to allow the mobile device's front-facing camera (e.g., FIG. 14, 874) to optimally follow a tracking image (FIG. 14, 1430) displayed on the mobile device's display (e.g., FIG. 14, 1400), the user is directed to move the device 800 into position 1715 with the display of the mobile device facing a reflective device such as a mirror. The tracking algorithm of the FSTA identifies the mobile device and provides guidance to the user from the display of the mobile device 800 to move/rotate the mobile device 1720 until it is determined that the mobile device is in optimal position to capture an image. As part of this process, the user may be directed to rotate, tip, move, or align the mobile device with respect to the reflective device's surface. The FSTA uses data obtained from the device's front-facing camera (e.g., FIG. 14, 874) to determine 1725 when the mobile device is in acceptable alignment for image capture, and then the FSTA modifies sensitivity 1730 of the forward-facing camera for optimal image capture. In one embodiment, image capture sensitivity may be different an initial sensitivity used during tracking of placement of the mobile device in front of the reflective surface. Depending on the operating system of the mobile device 800, different parameters may be modified in the mobile device to adjust camera sensitivity. In one embodiment, sensitivity is adjusted through changing an exposure compensation value associated with a camera in the mobile device 800. In another embodiment, shutter speed and ISO values associated with a camera in the mobile device 800 may be adjusted to achieve a desired sensitivity. Then, a capture image, such as a white screen or a screen with predetermined fiducial marks may be output 1735 to the display of the mobile device 800. An image is then captured 1740 by the front-facing camera (e.g., FIG. 14, 874) of the mobile device 800.

Those of skill in the relevant arts also appreciate that the rear-facing camera 872 of the mobile device 800 of the present invention may be used when facing a reflective surface to record an image of another surface of the mobile device 800, including, for instance, a back side of the mobile device casing. In this manner, defects in the casing may be analyzed by the optical neural network analysis of the present invention to detect casing defects, wear patterns, chipping, cracking, and the like.

Figure 18:
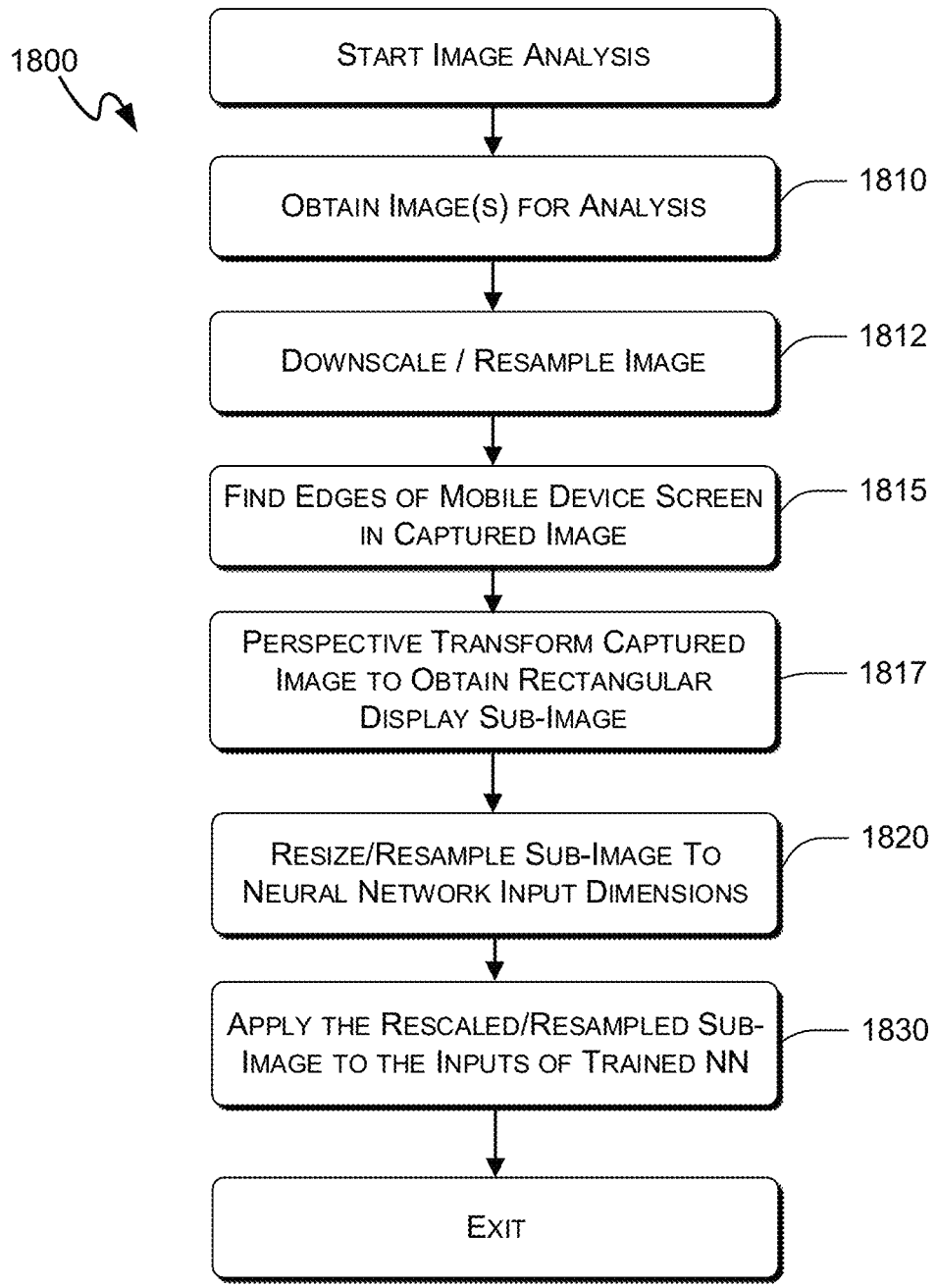
FIG. 18 illustrates a process flow diagram of the present invention, providing more detail regarding an exemplary image pre-processing method.

Returning to FIG. 16, after the captured image is pre-processed 1625, and uploaded 1630 to the host server, image analysis may begin 1635 in the server 860. FIG. 18 depicts an embodiment of image analysis in accordance with the present invention, where such analysis may be carried out by the server 860. Once the captured image has been received 1810 by the server 860, the captured image may be optionally downsized or resampled 1812 to reduce the size of the image file and increase processing efficiency. An example captured image may be seen in FIG. 19, wherein the mobile device 800 shows its display 1400 and is being handheld by a user. The edges of the display 1400 of the mobile device 800 are then located in the captured image 1815 through alternative methods.

Figure 19:
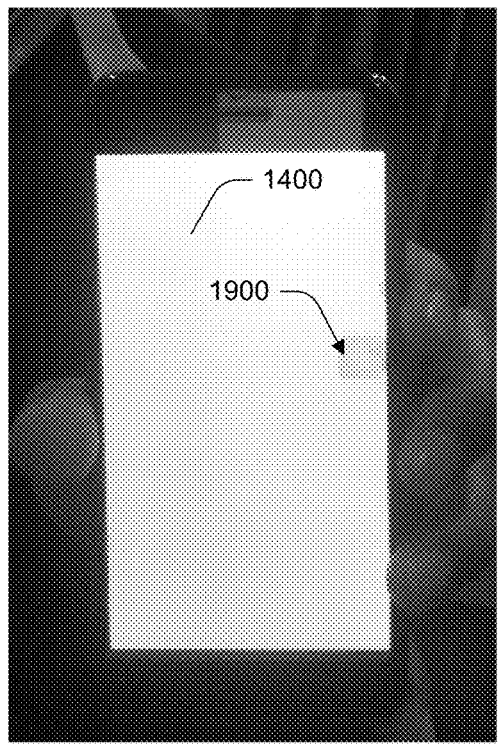
FIG. 19 shows an exemplary display of a mobile device with a defect on a display of the mobile device.
Figure 20:
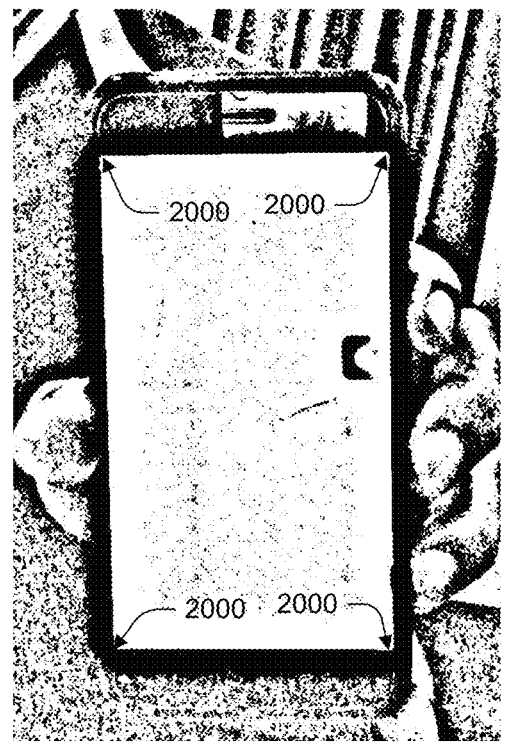
FIG. 20 shows an exemplary image of FIG. 19 after threshold techniques are applied.

In a first method to finding the edges corresponding to a display 1400, image threshold techniques are applied to the captured image (an example shown in FIG. 19) to produce a threshold-modified image (an example of the image of FIG. 19 after threshold techniques are applied may be seen in FIG. 20). Optical thresholding techniques are well understood to those of skill in the relevant arts, and example tutorials are provided at https://docs.opencv.org/3.3.1/d7/d4d/ tutorial_py_thresholding.html. Next, contours are found in the thresholded image, where contours comprise defined curves joining all the continuous points (along the boundary), having same color or intensity in an image. As contours are a useful tool for shape analysis and object detection and recognition, they may be used to assist in identification of the area of the captured image corresponding to the mobile device's display 1400. Contour analysis techniques are well understood to those of skill in the relevant arts, and example tutorials are provided at https://docs.opencv.org/3.3.1/d4/d73/tutorial_py_contours_begin.html. Once contours are determined in the thresholded images, contours having four points are analyzed and compared to known aspect ratios of the mobile device under analysis. Since the device data 45 identifies the device type, its display aspect ratio may be identified from preexisting lookup data (or externally from the device manufacturer) and may be used for comparison of aspect ratios of the four-point contours found in the thresholded captured image. Once a contour is identified in the thresholded image that is sufficiently similar in aspect ratio to the defined display aspect ratio for the particular mobile device under analysis, (for instance, the aspect ratio is within a predetermined tolerance value of the manufacturer's aspect ratio data), then the location of the vertices 2000 of the matching contour within the thresholded image are obtained, and the edges of the display within the captured images are thus located as the area within the four vertices that correspond to corners of the display 1400. Depending upon specific geometrical features of displays associated with particular mobile device manufacturers (e.g. rounded corners, notches intruding into displays, etc.) the edge boundaries image may be further refined using the known geometrical tolerances of the manufacturers device specifications.

Figures 21, 22:
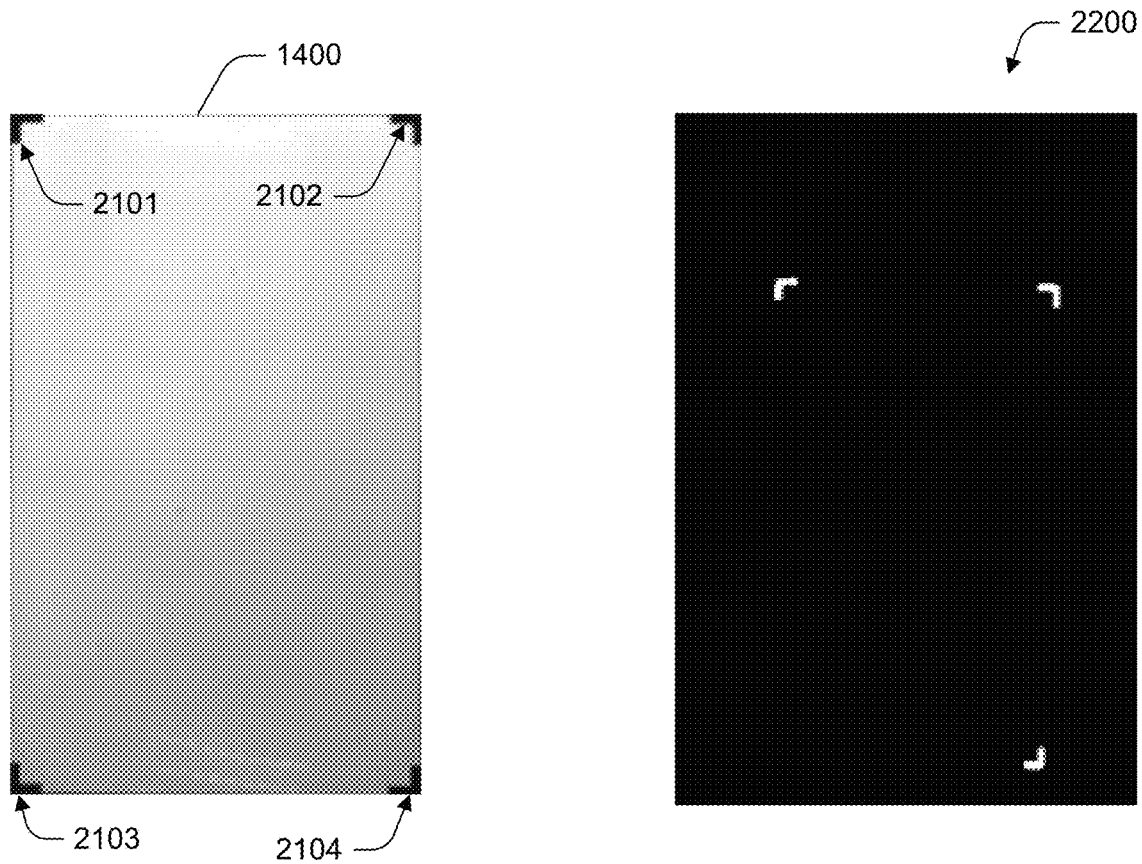
FIG. 21 shows an exemplary display of a mobile device of the present invention, showing corner fiducial markers.
FIG. 22 illustrates a template-matched modification of the image of the display shown in FIG. 21.
Figure 23:
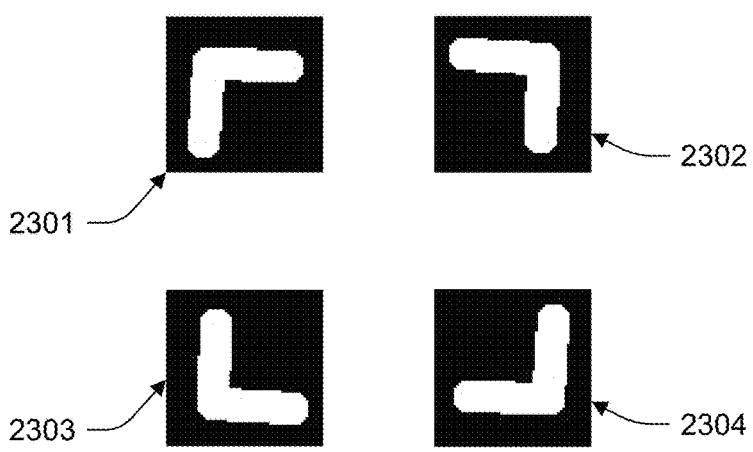
FIG. 23 illustrates template-matched corner markers obtained from the display image in FIG. 21 as used to determine edges of the display associated with a mobile device.

In a second technique for locating the edges corresponding to a display 1400, fiducials with a predetermined color (as shown in reference numerals 2101-2104 in FIG. 21) are output (FIG. 17, 1735) to the display 1400 of the mobile device 800 just prior to image capture. Placement of fiducials 2101-2104 appear proximate to the corner vertices of the display 1400, and image analysis techniques may be applied to determine the edges of the display of the mobile device within the captured image. Portions of the image are extracted using color range, and since the color of the fiducial marks is known, elements of the image appearing within a predefined tolerance value of the color of the fiducials appear in the extracted image. Next, polygons matching the respective shapes of the fiducials 2101-2104 are found through template matching approaches in the image, locating, for example, shapes 2301-2304 in FIG. 23, and the location of the corresponding corner vertices in the captured image can be determined by the respective locations of the corner vertices in the captured image (see FIG. 22, 2200). As with the first edge-detection technique mentioned immediately above, the edges of the display within the captured images are thus located as the area within the four vertices that correspond to corners of the display 1400. In an alternative embodiment, any kind of fiducial may be used to assist with identification of a component of the mobile device, such as by displaying a fiducial centered on a display of the mobile device, and then in conjunction with aspect ratios of display geometry associated with the device (looked up, for instance, from a manufacturer database of known mobile devices with associated specifications) then display edges may be refined by locating the search boundary as centered by the fiducial, and expanding to meet the outward boundaries using the geometry (and aspect ratios) of the associated mobile device. This method may be further refined if the fiducials output on the display of the mobile device are scaled to a known dimensions, (such as a cross with each side being a known dimension such as 1 centimeter), then the edges may be deduced by obtaining a scale factor with the depicted size of the fiducial scale in the image, then close tolerances to the outer boundaries of the display can be identified by applying the scale factor to the dimensions of the manufacturer's specifications for the mobile device's display edges. Further, the shape of the fiducial (such as orthogonal intersecting lines) may be used to de-skew the image so that edges can be better found that contain orthogonal geometries (such as rectangular sides).

Those of skill in the art further appreciate that while the word "display" or "screen" as it is used in the application generally includes an area where the mobile device may output a visual image, in other implementations of the present invention, the "display" or "screen" may include additional desired sections of the mobile device where visually detectable defects may be found. More particularly, in some mobile phone models, a first area may exist proximate to and above the active display area, and a second area may exist proximate to and below the active display area of the mobile device that is covered by a damageable material (such as hardened glass). While these proximate first and second areas may not be capable of rendering visual output (for example in older iPhone devices with speaker/camera/sensor orifices in the first area and a home button or microphone orifice in the second area), portions of these areas nonetheless may be damaged and it is a feature of the present invention to extend image analysis of the "display" or "screen" of the mobile device to these proximal first and second areas to detect damage in those areas as well. In other embodiments, a "notch area" removed from the active portion of a display may be included in the display analysis, and, for that matter, any desired area or surface of the mobile device where visual defect detection is desired. Additional tested areas of the mobile device, accordingly, may pertain to a back surface of the mobile device, a logo area of the mobile device, a side area of the mobile device a bezel area of the mobile device, or any other area for which a visual defect detection is desired. In one embodiment, a number of defects such as scratches or cracks that are found within a predetermined proximity to, or otherwise covering or touching a logo area of a mobile device (for instance, the "apple" logo on an iPhone model) may be determined and output upon defect analysis. Further, in various embodiments of the present invention, specific defects in the bezel of the mobile device, such as cracks, indentations, or pitting may be detected by visual analysis of an image of the mobile device. Images of the mobile device may be obtained by any desired method, such as by holding any surface of the mobile device in front of a reflecting device, capturing an image by a buddy or companion device equipped with a camera, or placing/rotating the mobile device in front of a mounted camera or other device that captures images (and/or video representations) of every surface of the mobile device and may optionally create a 3-d image representation of the mobile device. Further, defects may include any kind of visually detectable issues; in addition to cracks and scratches, display brightness variations, color variations (such as an undesired pink hue), LCD bleed, color failures, and any other desired type of visual defects may also be detected and identified. Additionally, crack/scratch depth, width, and/or other visual appearance criteria can be associated with identified cracks/ scratches, and reported with an intensity level to assist with classifying the impact of the identified crack/scratch on the mobile device's value.

Now that edges of the display 1400 can be deduced from the locations of the corner vertices in the captured image, the area of the captured image corresponding to the display area can be extracted as a sub-image and transformed to a rectangular shape in a single step. This is accomplished in one embodiment through calculating the moments of the display shape in the image and perspective transforming the display portion to a rectangular image through a technique known to those of skill in the art (an example of the perspective transform implementation can be found at https://www.pyimagesearch.com/2014/08/25/4-point-opencv-getperspective-transform-example/.

Figure 20A:
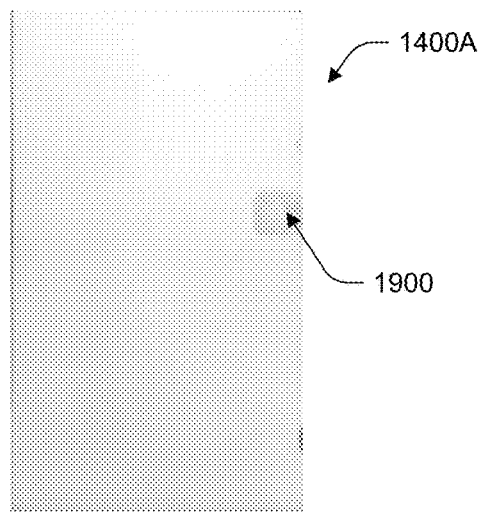
FIG. 20A illustrates an exemplary perspective-transformed subimage of a display of a mobile device, corresponding to the display portion of the captured image in FIG. 19.

Once the sub-image corresponding to the display 1400 from the captured image has been obtained, additional resizing/rescaling/resampling are undertaken so that the pixel dimensions of the sub-image are acceptable as input to the neural network 47 of the present invention. The sub-image can be resampled to any desired pixel configuration, and in one embodiment, the image is resampled to a 320× 544 pixel configuration (width, by height, in this example, corresponding to the portrait orientation of the sub-image). An example of a perspective-transformed subimage is shown in reference numeral 1400A of FIG. 20A, corresponding to the display portion of the captured image 1400 shown in FIG. 19. Defect 1900 appears in both images 1400, 1400A.

Figure 20B:
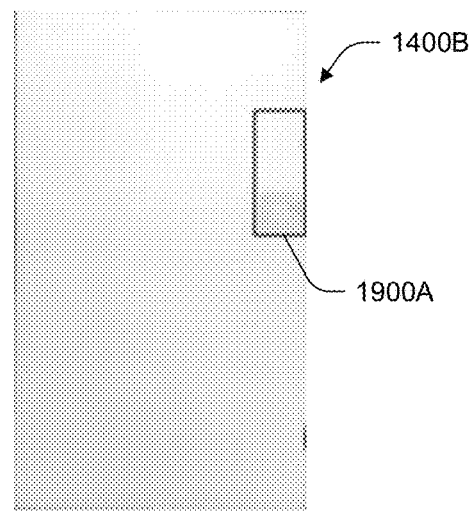
FIG. 20B illustrates an exemplary output of the present invention identifying a polygon-circumscribed defect of a display corresponding to the device of FIG. 19.
Figure 20C:
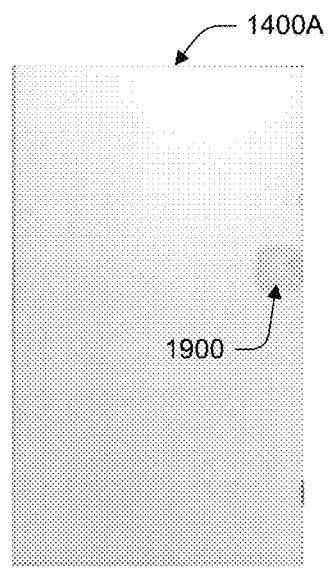
FIGS. 20C, D, and E respectively show: an exemplary device image for input to a convolutional neural network of the present invention, a heat map output identifying a defect likelihood area corresponding to the device image shown in FIG. 20C, and a polygon-circumscribed defect of a display corresponding to the device image shown in FIG. 20C.
Figure 20D:
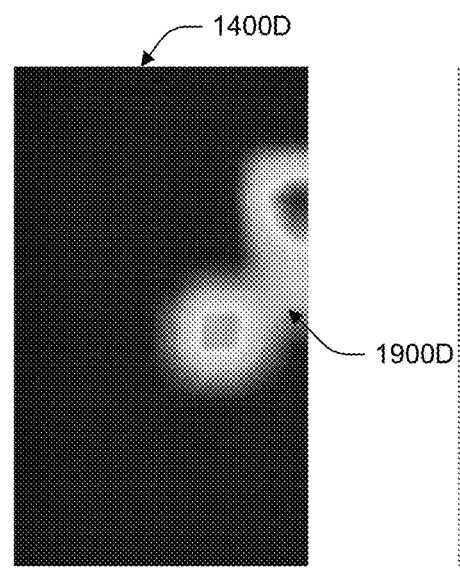
FIGS. 20F, G, and H respectively show: an exemplary device image for input to a convolutional neural network of the present invention, a heat map output identifying a defect likelihood area corresponding to the device image shown in FIG. 20F, and a polygon-circumscribed defect of a display corresponding to the device image shown in FIG. 20F.
Figure 20E:
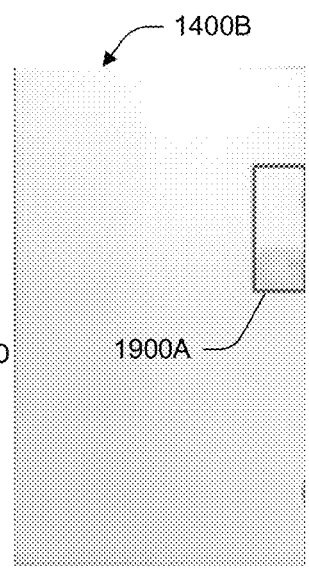
Figure 20F:
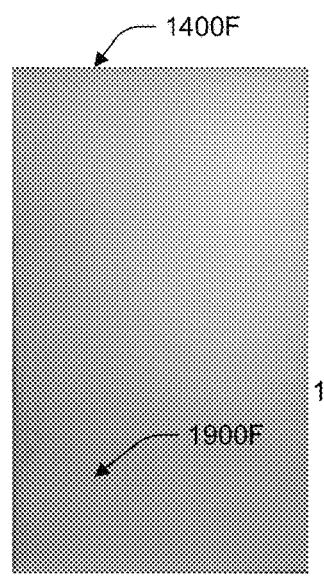
Figure 20G:
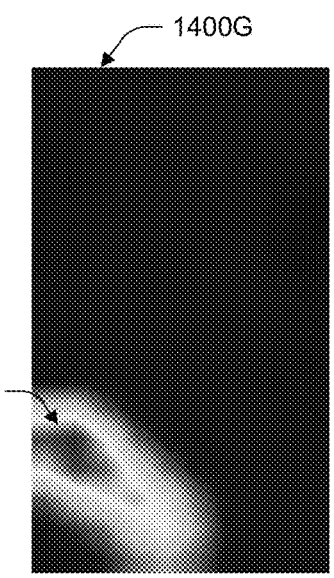
Figure 20H:
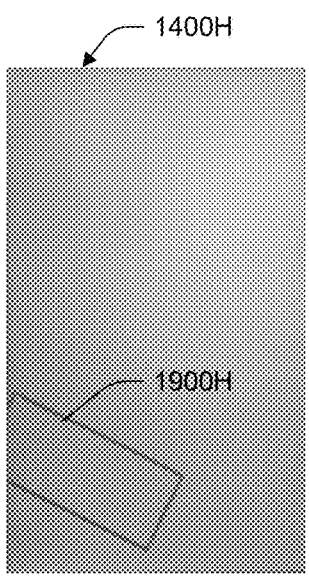

Step 1830 illustrates the analysis of the rescaled sub-image by a neural network to identify defects in the mobile device 800, and in particular, defects in the display 1400 of the mobile device. The rescaled and perspective-transformed sub-image (for instance, 1400A in FIG. 20A) is applied to the input of a convolutional neural network which has been previously trained to detect defects with training data comprising displays and accompanying defect classes. Once the network analyzes the image, an output is produced that identifies a defect, such with a colored polygon 1900A shown in FIG. 20B. The colored polygon draws attention to the defect found by the neural network, and as mentioned previously, additional outputs and analysis such as heat maps may be provided based on the particular network architecture. More illustrative examples follow in FIGS. 20C-E, where input sub-image (FIG. 20C, 1400A) with defect (FIG. 20C, 1900) is input to neural network 47 of the present invention, to produce an output (FIG. 20E, 1400B) with defect circumscribed by a polygon (FIG. 20E, 1900A), and a heat map output version (FIG. 20D, 1400D), depicting a heat map 1900D corresponding to activation classes for detected defects (FIG. 20C, 1900) in the display sub-image (FIG. 20C, 1400A). Another example is provided with a second input sub-image (FIG. 20F, 1900F), producing output (FIG. 20G, 1400G) with heat map indicating location of detected defect class (FIG. 20G, 1900G), and an output (FIG. 20H, 1400H) with defect circumscribed by a polygon (FIG. 20H, 1900H). Those of skill in the relevant arts understand that many other types of outputs are possible, and different defect types as explained previously may be detected though an appropriately trained CNN architecture.

Figure 16A:
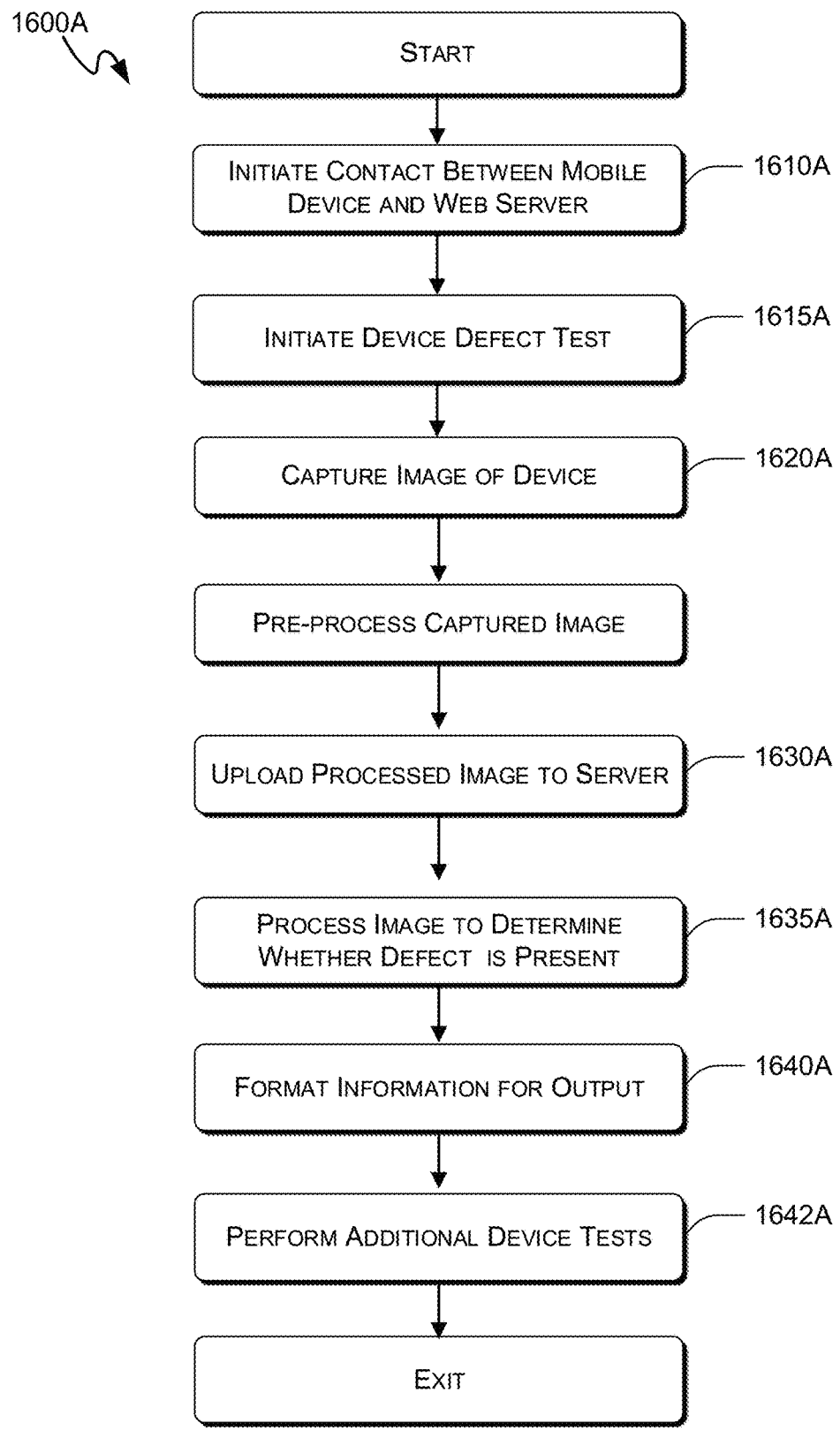
FIG. 16A shows a process flow diagram of the present invention, illustrating image capture and analysis to identify device defects without first installing an app on a mobile device.

FIG. 16A illustrates another embodiment 1600A of the present invention, and while certain analytical steps as described in regards to FIG. 16 may be implemented identically, embodiments of the present invention in regards to FIG. 16A utilize alternative approaches. More particularly, in one embodiment, the present invention may allow defects associated with a mobile device to be detected without having to first install a Fault State Test Application (FSTA). More particularly, in step 1610A, contact is initiated between the mobile device to be tested and a remote diagnostic service (RDS) such as a web server specifically configured with software and necessary communications circuitry to connect to the mobile device and remotely execute tests to determine whether defects can be found within the mobile device. Such contacts may be initiated in any desired manner, including by a data-based connection to a web address from the mobile device, the web address corresponding to a device diagnostic server, and wherein the mobile device user is prompted to enter identifying information, and the user test profile for the specific mobile device may be created and stored in a database associated with the web server along with diagnostic results. When the connection is initiated, and requested information is entered by the mobile device user, the user of the mobile device 800 indicates to the remote diagnostic service that defect testing is to commence 1615A. In one embodiment, the remote diagnostic service begins image capture process 1620A in a manner similar to the steps described in regards to FIG. 16; however, alternative embodiments include activating a webcam on the mobile device or a companion device to capture an image of the mobile device under test either directly or through a companion device; likewise, on the mobile device under test, a browser running from the RDS can open that device's rear-facing camera, then capture an image from either a front-facing or a rear-facing camera in view of a reflecting surface. If a companion device is used in conjunction with the mobile device to be tested, a websock connection may be initiated between the two devices to allow inter-device communication to command the devices to display and capture images. In this way, the mobile device under test may be remotely instructed by the RDS, through a browser on the mobile device, to capture a picture of itself in a reflecting device. Therefore, the RDS can facilitate image capture from a webcam, from either a front-facing or rear-facing camera of the mobile device itself, from a companion device also in communication with the RDS, and other methods where the RDS may initiate image capture. The captured images are then 1630A communicated through a communications link between the RDS and the mobile device (such as a connection to the web server previously established), where the RDS initiates analysis (1635A, 1640A) in a manner similar to the steps shown 1635, 1640, of FIG. 16. Those of skill in the relevant arts understand than the RDS may also be implemented with intelligent agents that are capable of interacting with the mobile device through a network, and thus conducting tests and obtaining information to support defect analysis regarding such mobile devices.

Additional defect testing (e.g. 1642A) may be conducted with aspects of the mobile device under test, whether associated with an RDS, or whether a FSTA was installed to conduct testing. For example, some tests are executed (either by the FSTA or remotely via a connection between the mobile device and the RDS) to determine, for example: (1) vibration test (determining, for example, that the device's vibrating agitator is functional); (2) Speaker test; (3) screen touch test; (4) front camera test; (5) back camera test; (5) screen pressure test; (6) accelerometer test; (7) gyroscope test; (8) battery state, including operational capacity, charging time, and whether the battery is swollen (thus indicating a potential defect/hazard state); and (9) recognition of mixed model/provenance, including association of a unique fingerprint or ID of the mobile device. Further, aspects of the present invention provide for sonic analysis to determine defects associated with the mobile device.

Through sonic analysis, a vibrational signal (such as an audio signal or known frequency mechanical vibration) is created and applied to the mobile device, and the microphone of the mobile device "listens" to what can be detected as a result. The captured audio signal from the microphone can then be analyzed to determine whether certain kinds of defects may exist in the mobile device. For example, a predetermined signal may be output from a speaker of the mobile device, (or alternatively through a vibration or vibration pattern induced by an agitator located in the mobile device) then the mobile device listens, though a microphone associated with the mobile device (or a companion device) for audio signatures received by the microphone of the mobile device; in one version, simple audio testing of various frequencies could identify whether the speaker/microphone pair are functional at the desired range of frequencies; further, spectral analysis of the audio signal captured by the microphone may identify certain defects in the speaker or microphone. The spectral analysis my further be compared with ideal propagation through a manufacturer-identical exemplar where sound propagation was classified, and defects such as cracks in glass attached to the mobile device may cause audio propagation discontinuities or rattles that may be deduced from the audio signal received from the microphone. Certain mechanical vibration patterns may also be created by the agitator to attempt to find resonant frequency rattles with loose parts within the mobile device that may be sensed by the received audio pattern of the device's microphone. Such spectral analysis may be performed in concert with neural network implementations that have been pre-trained to identify certain audio anomalies that correspond to defects that may be associated with the mobile device.

Through a process discussed in regards to FIG. 17, an image of the display of the mobile device 800 is captured 1620, and the captured image is optionally pre-processed 1625 by rotating the image to a portrait mode and/or fine rotating to reduce skew, and/or cropping the image to a desired aspect ratio. The captured (and optionally pre-processed) image is then uploaded 1630 to a server (such as server 860), and as discussed further in regards to FIG. 18, the uploaded image is processed 1635 to determine whether any cracks or other types defects are present. Alternatively, or in combination, the extent and characteristics of the screen cracks or defects are characterized by the processing step 1635 for further analysis and reporting. Once the analysis 1635 of any potential defects is complete, the resulting information is formatted 1640 for presentation, storage, or display to any user for any necessary purpose, such as for assessment of whether the mobile device 800 is in proper working condition. The process then exits 1645.

Figure 24:
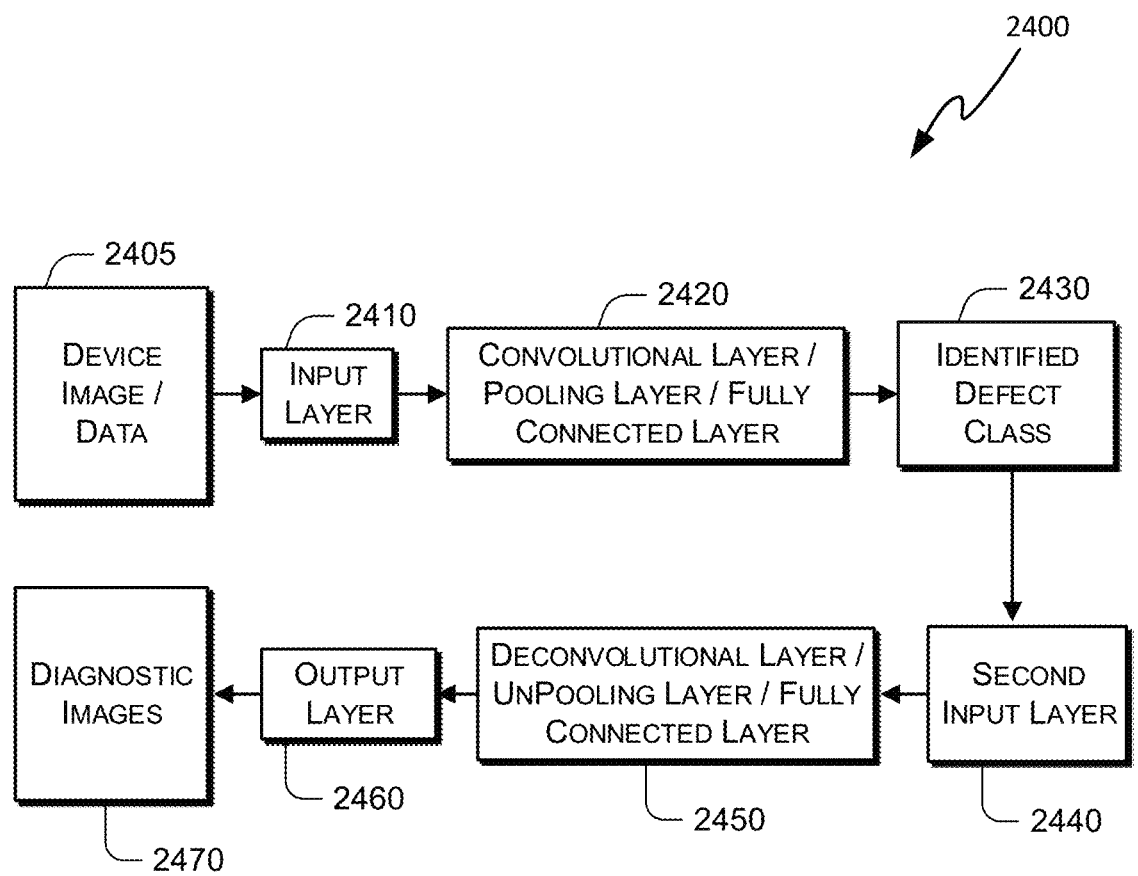
FIG. 24 illustrates a block diagram with data flows depicting one convolutional neural network arrangement regarding systems of the present invention.

FIG. 24 shows one exemplary data flow through a block diagram 2400 of a convolutional neural network (CNN) architecture of the present invention. Before presentation of device image or data 2405, the components of the CNN have been trained to recognize particular device defect classes, including defects such as scratches, cracks, and breaks in a device display. In one embodiment, the downscaled and resampled device image (for example, an image file as resulting from step 1820 of FIG. 18), along with any optional device data that may be used in processing an image associated with the device (such as a unique identifier associated with the device, including but not limited to an IMEI associated with the device) are presented 2405 to an input layer 2410 of the neural network. The input layer is communicatively coupled to block 2420, comprising at least one convolutional layer, a pooling layer, and a fully connected layer as conventionally implemented in a CNN. The trained CNN operates upon the input data and produces an output corresponding to an output showing any detected defect class 2430. Operation may end at that point with analysis of output of block 2430, or may continue to additional processing through input to a second input layer 2440. The defects in block 2430 may be presented to block 2450, where a de-convolutional layer, un-pooling layer, and fully connected layer further process and highlight features of the input image corresponding to locations where defects were located. An output layer 2460 provides output in the form of diagnostic images 2470, which may be stored in a database (for example, FIG. 8, 880) and associated in the database 880 with device data identifying the device image analyzed by the network 2400.

Generally, to increase the performance and learning capabilities of CNN models, the number of different network layers in the CNN can be selectively increased. The number of intermediate distinct layers from the input layer to the output layer can become very large, thereby increasing the complexity of the architecture of the CNN model. The present disclosure employs learning CNN models, to identify device defects and/or create visual maps indicating presence of a defect located within an image of a mobile device. Consistent with the disclosed embodiments, CNN system 2400 may be configured to generate outputs showing defects (such as identified defect 1900A in device display 1400B of FIG. 20E, or identified defect 1900H of display 1400H of FIG. 20H). Alternatively embodiments of the present invention provide that CNN system 2400 may be configured to generate outputs showing heat maps corresponding to areas of an image that corresponding likelihood of a detected defect class (such as identified heat map 1900D in device display 1400D of FIG. 20D, or identified heat map 1900G of display 1400G of FIG. 20G). For further illustration, the image 1400A in FIG. 20C would be presented as device image/data 2405 of network 2400, and FIGS. 20D and/or 20E would be obtained from the outputs of the CNN 2400. Similarly, the image 1400F of FIG. 20F would be presented as device image/data 2405 of network 2400, and FIGS. 20G and/or 20H would be obtained from the outputs of the CNN 2400. As explained above, depending on the particular embodiment, outputs may be obtained from either of blocks 2430 or 2470 of network 2400.

As used herein, and as explained above, a CNN model used by the disclosed system and method of the present invention may refer to any neural network model formulated, adapted, or modified based on a framework of convolutional neural network. For example, a CNN model used to identify device defects in embodiments of the present disclosure may selectively include intermediate layers between the input and output layers, such as one or more convolutional/de-convolutional layers, non-linear operator layers, pooling or subsampling layers, fully connected layers, final loss layers, deconvolution layers, and/or unpooling or upsampling layers.

In an alternate embodiment, outputs from the CNN model may be trained to produce either a heat map or a specific defect identification without deconvolutional layers without needing further processing after block 2430. Accordingly, in one embodiment, outputs are created through class activation maps through training output layers of a neural network of the present invention, and in one embodiment, heat maps may be output as described previously. In one aspect, heat maps are generated through obtaining mapping functions on each section of an image being output by a trained neural network of the present invention. Mapping functions within each subsection of an image may use scores on the subsections of the image to identify specific defect classes when the trained network has detected a defect in the image data. In one implementation of the present invention, a heat map may be obtained from a particular layer within the CNN model itself. As those of skill in the neural network training arts understand, for example, a softmax function may be used in the final layer of a CNN defect classifier, and may be used to generate the heat map by computing the resulting layer element scores, produce the output into shape of the image data and overlay that upon the area corresponding to the test image to identify a heat map. Alternatively, in one embodiment, the CNN may reduce or strip down aspects of the input data image, apply different convolution layers, capture the outputs of one of the convolution layers, (output across the entire image), and produce a score for each part of the image, which in turn produces a defect activation map. The areas that exceed a predetermined level of activation may be converted in output image data to a specific color, for instance red, to identify defects found on the test image (for instance, read color to an area of the image corresponding to a display crack in the test image). As a further aspect, in the network output layers, a threshold (compared to a predetermined color threshold value) may be performed on the image data to find the red portion of the image, then a minimum bounding rectangle may be placed around the red area to more particularly identify the defect area.

Figure 25:
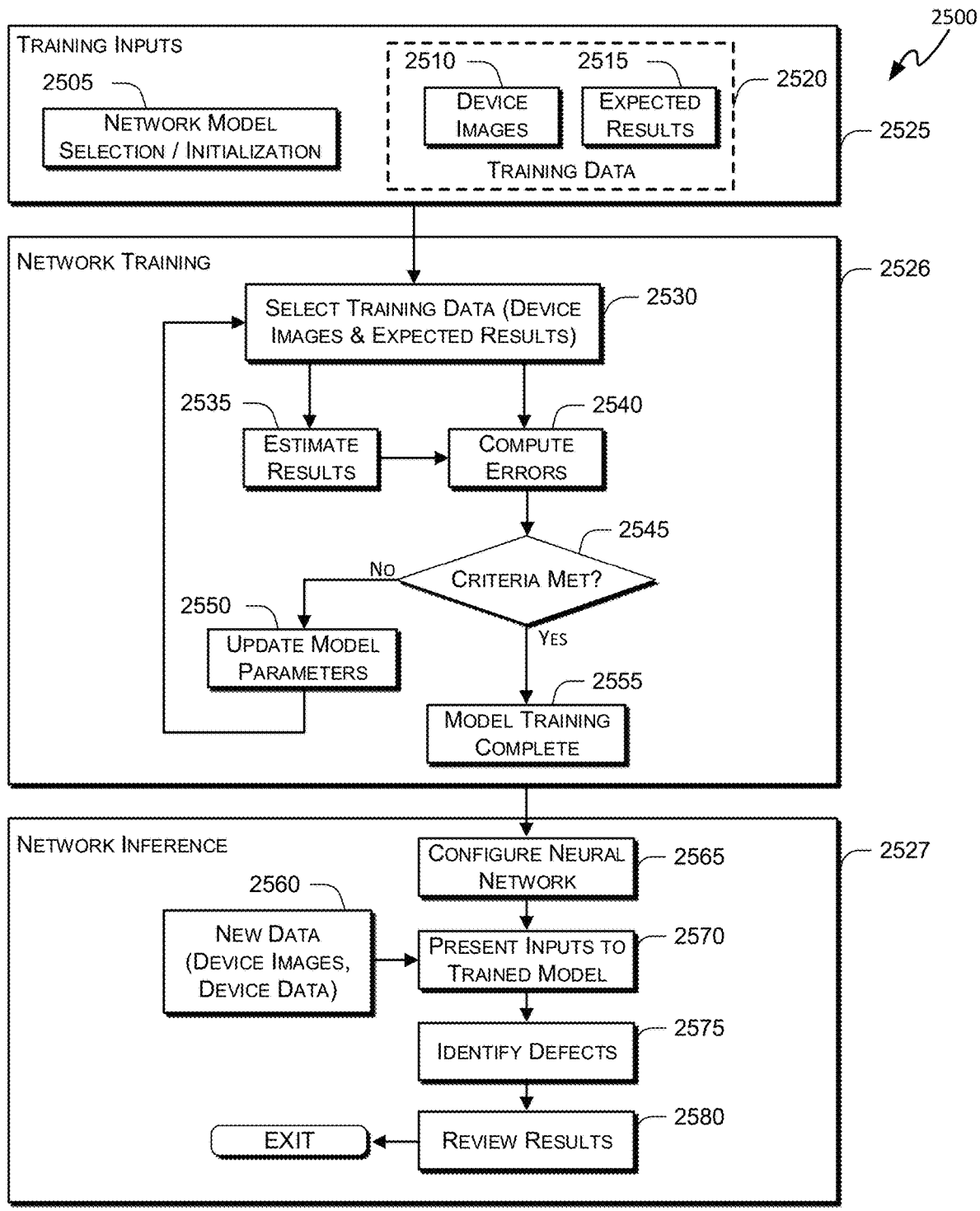
FIG. 25 illustrates a comprehensive flow diagram describing neural network training from network training data, and network inference processes to identify defects using the trained neural network.

FIG. 25 presents an overview of a flow diagram 2500 for an embodiment of the present invention, including three phases: a training preparation phase 2525, a network training phase 2526, and a network inference phase 2527. As discussed in brief previously, disclosed systems and methods for identifying device defects generally include several stages that will be discussed in turn; for example a training stage that "trains" or "learns" a CNN model using training datasets, and a prediction or inference stage in which the trained CNN model uses the training datasets and input data to identify device defects (and/or defect classes). As mentioned above, the aforementioned training stages generally correlate with the network training 2526 as depicted in FIG. 25. As used herein, "training" a CNN model refers to determining one or more parameters of at least one layer in the CNN model. For example, a convolutional layer of a CNN model may include at least one filter or kernel. One or more parameters, such as kernel weights, size, shape, and structure, of the at least one filter may be determined by e.g., a back-propagation-based training process. Further, the aforementioned description regarding FIG. 24 generally correlates with network inference 2527 as depicted in FIG. 25. As used with respect to the embodiment described herein, "predicting" from a CNN model refers to identifying device defects from an image of a device using any desired type of a processed image of the device 2510, including in one embodiment, an image of a display of the device.

In the training preparation phase 2525, training inputs 2520 are prepared and processed for use in training the CNN neural network component (e.g., FIG. 8, 47). A network model is selected 2505 for use in training; such model selection may include, for example, identification of a convolutional neural network architecture and appropriate processing layer configuration. The neural network component model (FIG. 8, 47) is initialized with an initial layer configuration, an initial connection configuration, a set of weights, and a set of biases. In addition to device images 2510 and respective expected results (also known to those of skill in the relevant arts as "ground truth" data) 2515, other parameters (as described more fully below) may be specified for input as training data 2520, such as identifying information for each respective device image. In an embodiment, training data 2520 may also include data for actual defective devices or simulated defective devices. In another embodiment, training data 2520 may be synthetically created, e.g. computer-generated images based upon theoretically possible defect types situations or devised for purposes of model testing.

In various embodiments, and in a manner similar in context with process 1800 of FIG. 18, the preparation phase 2525 includes resampling all imaging data in the training data 2520 to a common grid size and grid spacing. Then, image pixel values can optionally be resampled to common scale across all image data in the training data 2520 to improve learning performance and convergence based on training data furnished to the network. After data preparation, training data and testing data represent device images and respectively corresponding identified defects comprising the ground truth data.

The network training phase 2526 commences with training data 2520 being presented to the configured and initialized neural network model from step 2505 (with no input specified). The neural network component (FIG. 8, 47) estimates results 2535 from the patient image data and produces estimated results, for example, an identified defect class. A comparison is then made between the estimated results from step 2535 and the expected results 2515 corresponding to the device images 2510, and an error map ("training error") is generated based on differences between the expected results 2515 and the estimated results 2535. The error map is compared to evaluation criteria 2545. For example, a loss function such as a mean absolute error function (MAE), or mean squared error (MSE) function, can be used to determine whether error criteria are met. One skilled in the art would be familiar with various loss functions, such as the mean absolute error (MAE) of the model prediction or $L_1$ norm $J(\theta^*)=\arg\min_\theta \|Y=Y^*\|_1$, or the mean squared error (MSE) or $L_2$ norm $J(\theta^*)=\arg\min_\theta \|Y=Y^*\|_2$ where $\theta^*$ comprises the choice of parameters that minimizes the differences between Y and Y*. A back-propagation algorithm may be used to compute the gradient of the error function with respect to the model parameters or weights. Then $\theta$ may be updated iteratively using a stochastic gradient descent algorithm to converge on $\theta^*$.

If the errors do not satisfy the error threshold criterion, the model parameters of the neural network (FIG. 8, 47) (e.g., weights and biases) are updated 2550, e.g. to minimize error according to a learning algorithm (e.g. a regularized gradient descent optimization approach), and the training data is re-presented 2530 to the neural network (FIG. 8, 47) with the neural network's newly-assigned model parameters.

In one embodiment, determining whether criteria are met 2545 includes presenting one or more test device images that are different from the training images (but have no defects pre-identified) to the network model as currently configured to generate an estimate of defects respectively corresponding to such test device images. The resulting defect classifications can then be compared with the ground truth/expected defect classifications to assess the quality of the network parameter model. The differences between the expected defects and the estimated defects for this test data is the "test error." In any event, iteration from step 2550 to step 2530, to steps 2535 and 2540, to step 2545 continues until the error threshold criterion is met, whereupon the training process 2525 concludes 2555, with a trained neural network component model ready for use with captured images of real devices and corresponding data (FIG. 8, 45, 46).

In an alternative embodiment, the neural network (FIG. 8, 47) may be trained in multiple steps and various portions of the neural network may be trained with separate training data sets to achieve particular defect classification. For example, a convolutional neural network of the present invention may be pre-trained to recognize a large number of generic visual object classes, and then a final layer of the network may be retrained to identify specific visual items, such as screen defects (e.g., cracked or damages displays of a mobile device). In one version of the present invention, characteristics regarding the defect (e.g. a display crack) may be provided in the training data associated with training images, and may be provided in various embodiment without coordinates of where such crack may exist in the training data image, and in still other embodiments, the training data images that show defects (e.g. display cracks) are accompanied by coordinates identifying the cracked areas within the image so that training of the output layer may be optimized. Using multiple training passes, such as training a network with a large number of visual classes then retraining a final layer of the network with specific defects to be detected may provide embodiments with advantages of efficiency over retraining an entire network if the training data 2560 is updated or changed with new defect types or updated amounts of training examples.

Once trained, the neural network component model (FIG. 8, 47) may be stored in a memory such as the server memory (e.g., FIG. 8, 16), within non-transitory memory of the network component (FIG. 8, 47) or in a database (e.g. FIG. 8, 880). The trained network model may then be used in the network inference steps 2527 to compute a useful output (e.g. classified defects associated with a device) when presented with mobile device images and/or data (FIG. 8, 45, 46) for which defect analysis is desired. The trained network is configured 2565, for example, by loading stored weights and biases for the particular trained network configuration. Patient data inputs are presented to the trained and configured neural network component (FIG. 8, 47) to obtain predicted results. In a preferred embodiment, predicted results comprise one of a defect classification with identified defects, or a defect classification with a displayed heat map. Thus, for the device of interest, device images and/or data 2560 are presented to the trained and configured neural network model 2570 to produce the predicted results 2575. In a further embodiment, the predicted results are in turn reviewed 2580 by any desired entity, such as for use in determining the insurability of a mobile device or validity of an insurance claim for the mobile device.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method comprising:
installing an executable program on a mobile device;
prompting a user of the mobile device to place the mobile device so that a display section of the mobile device faces a reflective surface of a mirror;
performing a tracking calibration function to adjust the mobile device position and display for optimal image capture;
modifying a brightness setting and a camera sensitivity setting of the mobile device to optimize image capture; and
determining that the mobile device is in an acceptable orientation with respect to the mirror, and thereupon:
capturing an image of the mobile device as reflected from the mirror;
processing the captured image to determine whether a defect can be identified in the display of the mobile device, wherein the processing further comprises:
extracting, from the captured image, a subimage corresponding to a screen of the mobile device; and
transforming a perspective of the subimage into a rectangular aspect;
presenting transformed subimage to a pre-trained convolutional neural network (CNN) to identify one or more device defects; and
obtaining from the pre-trained neural network an indication of a first defect from the one or more device defects that corresponds to the screen of the mobile device, further including an indicia, created through class activation mapping functions, showing a portion of the mobile device screen that activates a defective class in the pre-trained neural network.

2. The method of claim 1, further comprising formatting results of the determining step for transmission to a host server.

3. The method of claim 1 wherein the tracking calibration function further comprises:
retrieving one or more ambient lighting parameters from the mobile device;
adjusting a brightness parameter of the display of the mobile device based upon the retrieved ambient lighting parameters;
adjusting a sensitivity parameter of the camera of the mobile device from the retrieved ambient lighting parameters; and
determining from camera data obtained from the mobile device that the mobile device is out of optimal placement, whereupon:
a direction for the user to move the mobile device to obtain an optimal placement of the mobile device with respect to the mirror is calculated; and
the direction is displayed on the mobile device in a manner readable in the mirror by the user.

4. The method of claim 3 wherein adjusting a sensitivity parameter of the camera of the mobile device further comprises:
adjusting an ISO setting of the camera; and
adjusting a shutter speed of the camera.

5. The method of claim 3 wherein adjusting a sensitivity parameter of the camera of the mobile device further comprises adjusting an exposure compensation value associated with the camera of the mobile device.

6. The method of claim 3 further comprising:
displaying one or more fiducials on the display of the mobile device; and
sensing one or more of the fiducials from camera data obtained from the mobile device.

7. The method of claim 3 wherein: retrieving one or more ambient lighting parameters from the mobile device further comprises obtaining the parameters from an API associated with an operating system installed on the mobile device.

8. The method of claim 1, wherein processing the captured image further comprises:
rotating the captured image to a portrait mode; and
cropping the rotated image.

9. The method of claim 8, wherein:
the rotating and cropping steps are performed by a processor of the mobile device; and
the rotated and cropped image is further formatted for transmission to a host server.

10. The method of claim 1, wherein processing the captured image to determine whether a defect can be identified in the display of the mobile device further comprises:
resampling the transformed subimage to a predetermined input image data configuration;
presenting the resampled transformed subimage to the pre-trained neural network to identify one or more device defects; and
obtaining from the pre-trained neural network an indication of a first defect from the one or more device defects that corresponds to the screen of the mobile device.

11. The method of claim 10, wherein obtaining from the pre-trained neural network an indication of a first defect further comprises identifying a local area of a fault in the display of the mobile device using class activation mapping.

12. The method of claim 10, further comprising:
receiving, by a server communicatively coupled to the mobile device, the captured image, and
wherein the processing of the captured image is performed within a processor of the server.

13. The method of claim 10, further comprising training the pre-trained neural network with training data stored in a database in the server, the training data comprising at least: device screen training images and identified defects respectively corresponding to the device screen training images.

14. The method of claim 13, wherein the training data stored in the database is augmented with a new training image corresponding to a captured image of the mobile device and a corresponding identified defect associated with the captured image of the mobile device.

15. The method of claim 14, further comprising re-training the pre-trained neural network with the augmented training data.

16. The method of claim 10, wherein the predetermined input image data configuration comprises a pixel configuration of 320×544 pixels.

17. The method of claim 10, wherein the one or more device defects comprises one of:
a crack in the display of the mobile device;
one or more stuck pixels in the display of the mobile device;
one or more dead pixels in the display of the mobile device;
blemish or crack on a casing of the mobile device;
LCD bleed on the display of the mobile device;
a pink hue defect on the display of the mobile device; and
combinations thereof.

* * * * *